(12) United States Patent
Restko et al.

(10) Patent No.: US 12,472,422 B1
(45) Date of Patent: Nov. 18, 2025

(54) BATTING GLOVE AND CUSHIONING APPARATUS

(71) Applicants: Jason T. Restko, Tinley Park, IL (US); Leonard J. Stubenfoll, Orland Park, IL (US); David J. Payton, Orland Park, IL (US)

(72) Inventors: Jason T. Restko, Tinley Park, IL (US); Leonard J. Stubenfoll, Orland Park, IL (US); David J. Payton, Orland Park, IL (US)

(73) Assignee: Jax Athletics, LLC, Tinley Park, IL (US)

( * ) Notice: Subject to any disclaimer, the term of this patent is extended or adjusted under 35 U.S.C. 154(b) by 599 days.

(21) Appl. No.: 16/824,453

(22) Filed: Mar. 19, 2020

Related U.S. Application Data

(63) Continuation-in-part of application No. 14/986,728, filed on Jan. 4, 2016, now Pat. No. 10,850,181.

(60) Provisional application No. 62/099,352, filed on Jan. 2, 2015.

(51) Int. Cl.
| | |
|---|---|
| *A63B 71/14* | (2006.01) |
| *A41D 19/015* | (2006.01) |
| *B32B 5/18* | (2006.01) |
| *B32B 7/09* | (2019.01) |
| *A63B 102/18* | (2015.01) |

(52) U.S. Cl.
CPC ...... *A63B 71/143* (2013.01); *A41D 19/01523* (2013.01); *A41D 19/01547* (2013.01); *B32B 5/18* (2013.01); *B32B 7/09* (2019.01); *A41D 2600/10* (2013.01); *A63B 2102/182* (2015.10); *A63B 2209/10* (2013.01); *B32B 2266/0278* (2013.01); *B32B 2266/08* (2013.01); *B32B 2305/022* (2013.01); *B32B 2305/30* (2013.01); *B32B 2307/56* (2013.01); *B32B 2437/02* (2013.01)

(58) Field of Classification Search
CPC .......... A63B 71/143; A63B 2069/0008; A63B 2102/182; A41D 19/01523; A41D 19/01547; A41D 2600/10
USPC .............................................................. 2/19
See application file for complete search history.

(56) References Cited

U.S. PATENT DOCUMENTS

| | | | | |
|---|---|---|---|---|
| 2,452,695 | A | * | 11/1948 | Sonnett ................ A63B 71/143 D29/115 |
| 2,521,488 | A | | 9/1950 | Smith |
| 4,295,229 | A | | 10/1981 | Clark et al. |
| 4,987,611 | A | | 1/1991 | Maye |
| 5,884,329 | A | | 3/1999 | Goldsmith et al. |
| 5,987,646 | A | | 11/1999 | Bolmer |
| 5,996,117 | A | | 12/1999 | Goldsmith et al. |

(Continued)

FOREIGN PATENT DOCUMENTS

| | | |
|---|---|---|
| EP | 0293526 A1 | 12/1988 |
| KR | 200348492 Y1 | 4/2004 |

*Primary Examiner* — Alissa J Tompkins
(74) *Attorney, Agent, or Firm* — Paul J. Nykaza; Schacht Law Office, Inc.

(57) ABSTRACT

A batting glove (10) has a cover member (12) defining a central opening and a plurality of finger elements (20) including a forefinger element (24) and a thumb element (22). The batting glove (10) has a web member (14) generally positioned between the forefinger element (20) and the thumb element (22). The web member (14) minimizes force against a thenar region of a wearer's hand from a bat in response to hitting a ball with the bat.

31 Claims, 24 Drawing Sheets

(56) References Cited

U.S. PATENT DOCUMENTS

| | | | |
|---|---|---|---|
| 6,253,382 B1 * | 7/2001 | Kleinert | A63B 71/143 |
| | | | 2/163 |
| 6,389,601 B2 | 5/2002 | Kleinert et al. | |
| 6,427,246 B1 * | 8/2002 | Doi | A41D 19/01588 |
| | | | 2/161.1 |
| 6,654,965 B2 * | 12/2003 | Hochmuth | A63B 71/148 |
| | | | 2/161.1 |
| 7,381,460 B2 * | 6/2008 | Palmer | F16F 9/30 |
| | | | 428/314.4 |
| 2004/0068777 A1 | 4/2004 | Wheelington | |
| 2006/0218689 A1 | 10/2006 | Brown | |
| 2008/0235842 A1 | 10/2008 | Patel et al. | |
| 2011/0173733 A1 | 7/2011 | Krzeminski | |
| 2012/0117703 A1 | 5/2012 | Jaramillo et al. | |
| 2012/0284892 A1 | 11/2012 | Szurley et al. | |
| 2013/0061368 A1 | 3/2013 | Filippone | |
| 2014/0182047 A1 | 7/2014 | Silkoff et al. | |
| 2015/0313298 A1 | 11/2015 | Bailey et al. | |

* cited by examiner

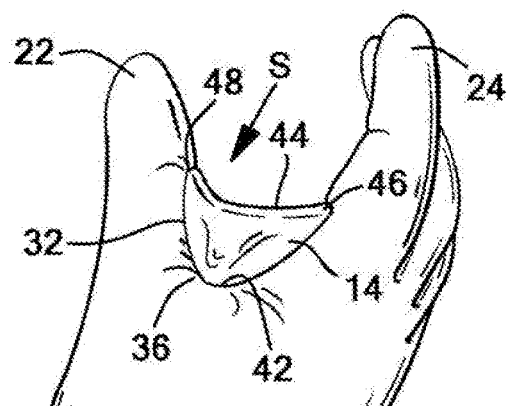
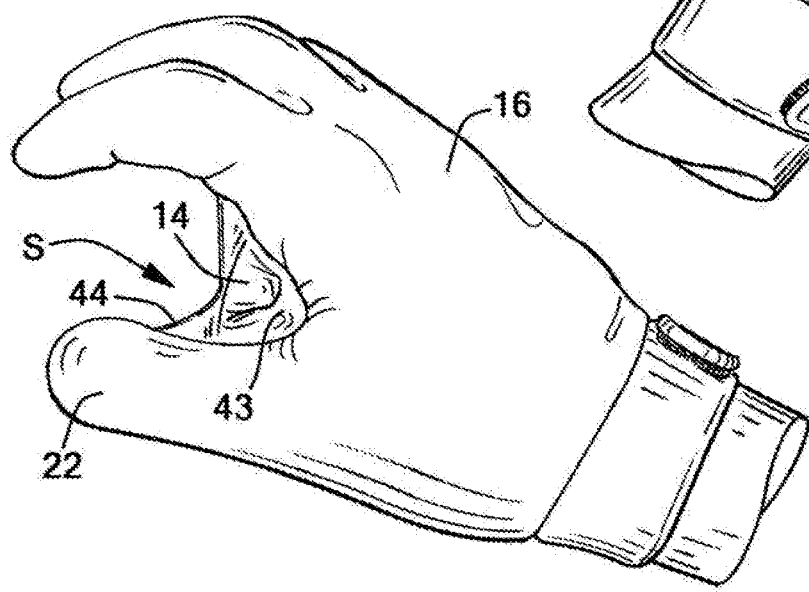
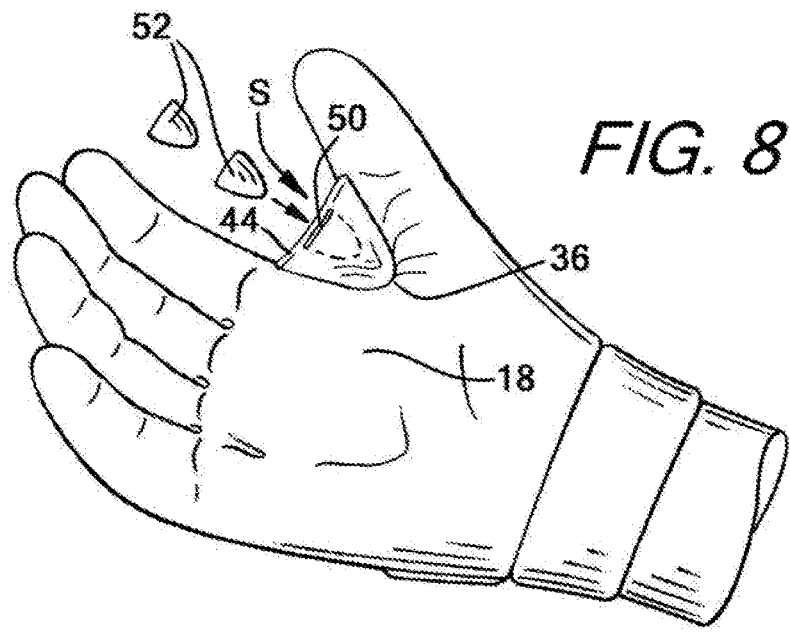

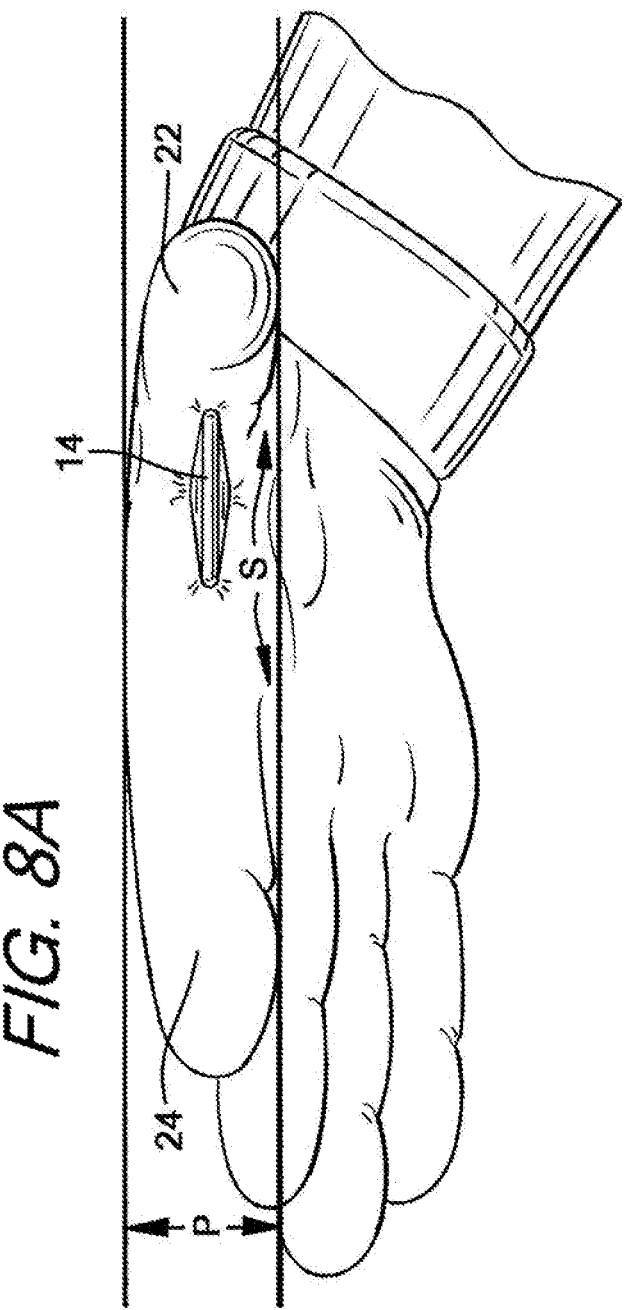
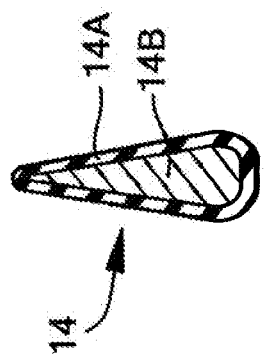
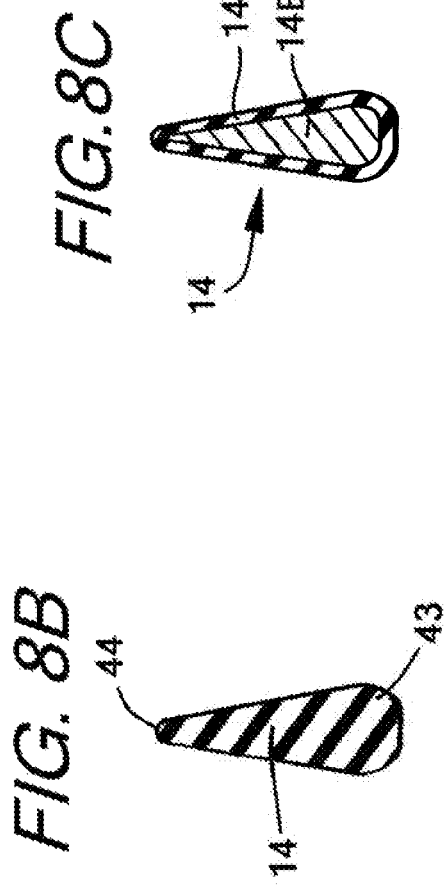

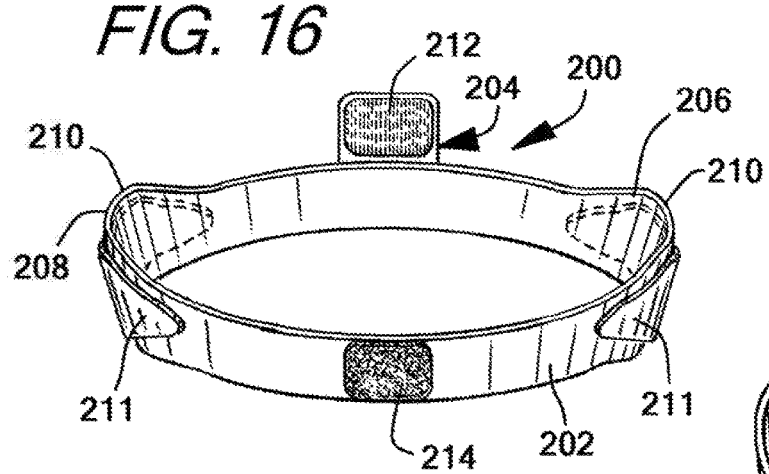
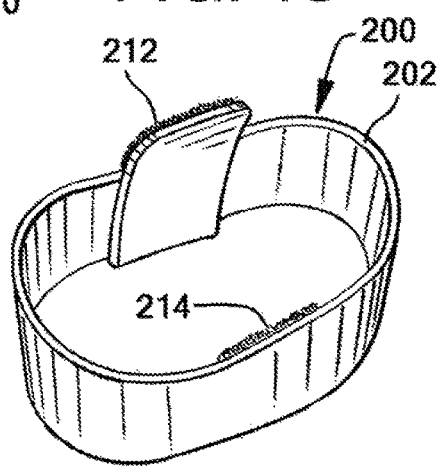
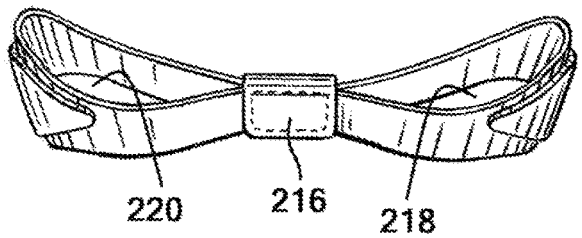
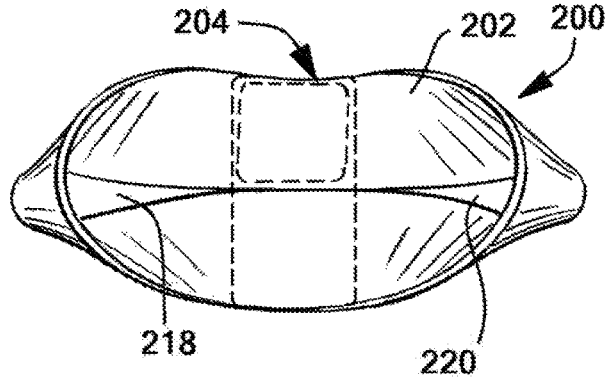
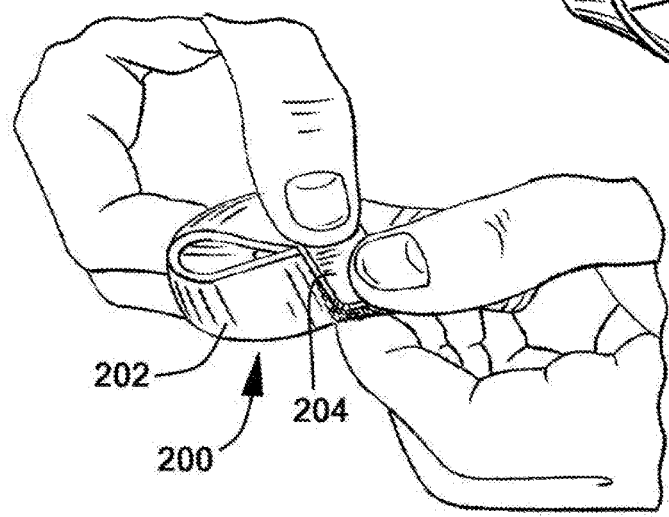

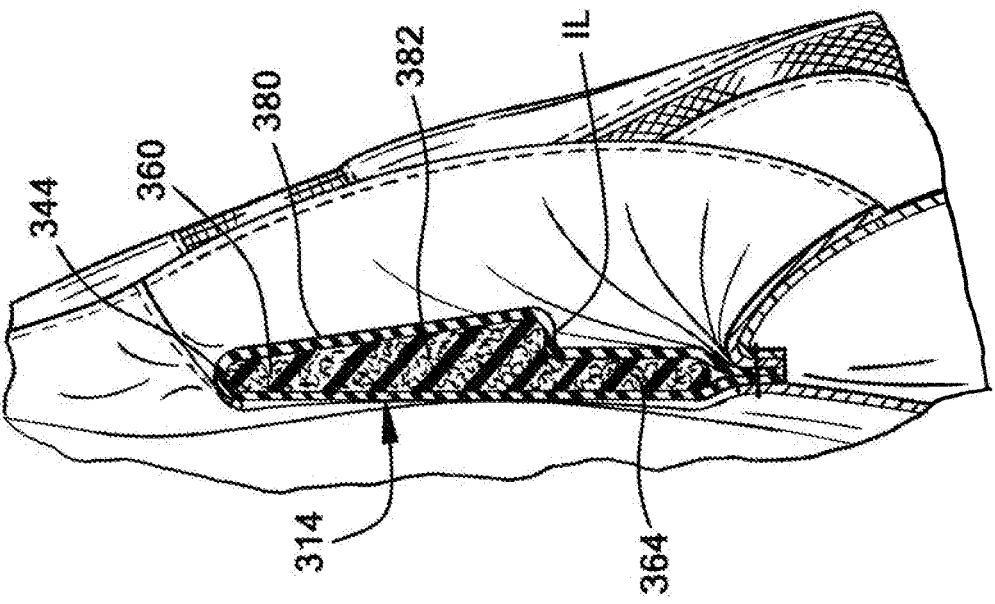
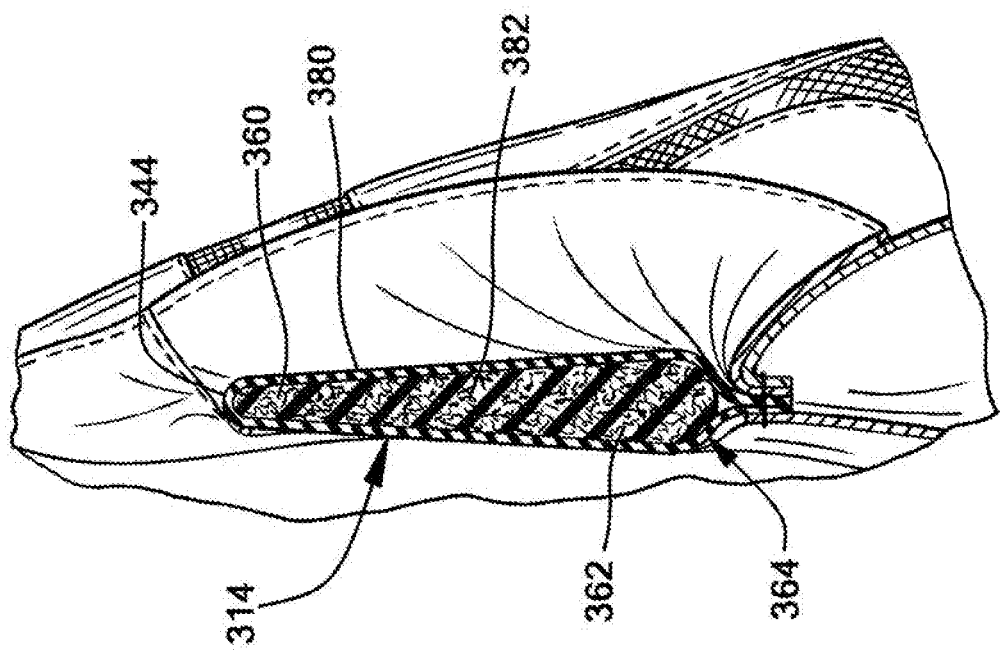

BATTING GLOVE AND CUSHIONING APPARATUS

CROSS-REFERENCE TO RELATED APPLICATIONS

The present application is a continuation-in-part patent application of U.S. patent application Ser. No. 14/986,728, filed on Jan. 4, 2016, which claims the benefit of U.S. Patent Application No. 62/099,352, filed on Jan. 2, 2015, which applications are incorporated by reference herein in their entireties.

FEDERALLY SPONSORED RESEARCH OR DEVELOPMENT

None.

TECHNICAL FIELD

The invention relates generally to a protective glove for the human hand that is typically worn when playing sports that utilize hand-held implements or used in other activities and, more particularly, to a batting glove having structures to enhance protection, comfort and grip of the wearer.

BACKGROUND OF THE INVENTION

Athletic gloves for the protection and performance of the human hand in sports are known in the art. Athletes often wear such gloves when playing sports that require the use of hand-held implements such as baseball/softball bats, golf clubs, tennis racquets, racquetball racquets, and sticks such as hockey sticks and lacrosse sticks. Repetitive use of such implements can subject the athlete's hands to stress from impacts with a ball or puck wherein force impacts propagate into the hands. For example, a baseball player who repetitively hits baseballs can often experience soreness or pain in the hand, especially in the webbing area between the thumb and forefinger of the hand, sometimes referred to as the thenar region or thenar space. The soreness or pain may particularly be in the thenar region of the "top hand" of the player, e.g., the right hand for a right-handed batter and the left hand for a left-handed batter. Such soreness or pain in the thenar region can also be experienced when the batter hits a ball more towards the hands of the batter, e.g., being jammed, such as shown in FIG. 1. An athlete may also experience pain or discomfort in the fingers of the hands such as when the batter hits a ball towards the end of the bat such as shown in FIG. 2. In such occurrence, the bat will overly vibrate causing discomfort in the fingers. These bat/ball contact points often subject the hand to targeted stress in the thenar region as schematically shown in FIG. 1 and in the fingers as schematically shown in FIG. 2. The stress can also propagate throughout the hand including tissues and muscles. Such stress can be heightened if the player experiences multiple impact occurrences during the course of a game or consistent impact occurrences without sufficient recovery time. This stress results in soreness and pain that can linger in the athlete's hand over the course of a season. Consequently, the player's performance and overall enjoyment of the game is adversely affected. This phenomenon can also be experienced in other circumstances such as when gripping bicycling handlebars. For example, a rider can experience repeated jolts and jarring to the hands during mounting biking or prolonged stresses when gripping road bike handlebars during long road rides.

While athletic gloves such as batting gloves according to the prior art, provide a number of advantageous features, they nevertheless have certain limitations. Existing batting glove designs incorporate padding that is positioned over various portions of the hand. Designs that sufficiently and efficiently minimize impact to the thenar region of the hand while not sacrificing comfort, grip or other performance have nevertheless been seriously lacking. The present invention is provided to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention provides an athletic glove such as a batting glove having a cushioning element or padding element configured to protect the webbing area of the hand between the thumb and forefinger, often referred to as the thenar region of the hand.

According to a first aspect of the invention, a batting glove is provided having a cover member defining a central opening and a plurality of finger elements and a thumb element. The batting glove has a web member positioned between the thumb element and a forefinger element. The web member minimizes force against a thenar region of a wearer's hand from a bat in response to an impact from hitting a ball with the bat.

According to another aspect of the invention, a batting glove has a cover member having a central opening and plurality of finger elements including a forefinger element and a thumb element configured to receive respective fingers and thumb of a user. A web space is between the forefinger element and the thumb element. The batting glove has a web member having a first portion connected proximate a finger element and a second portion connected proximate the thumb element. The web member is positioned in the web space.

According to a further aspect of the invention, the cover member has a curved segment extending from proximate the forefinger element to proximate the thumb element. The web member has a curved portion generally corresponding to the curved segment of the cover member. The curved portion of the web member is connected to the curved segment of the cover member.

According to another aspect of the invention, the web member has a pocket configured to receive cushioning inserts. The cushioning inserts can take the form of foam rubber, gels, putty or inflatable members.

According to a further aspect of the invention, the web member has extended segments to cover portions of the forefinger element and thumb element of the batting glove.

According to another aspect of the invention, the web member is configured to be removably attached to the batting glove.

According to another aspect of the invention, a cushioning apparatus protects against force impacts generated in response to hitting a ball with a baseball bat. The apparatus has a generally annular band in a first configuration wherein the band is dimensioned to be capable of being worn on a wrist. The apparatus also has a fastener operably connected to the band wherein the fastener is activated to place the band in a second configuration wherein a first portion of the band is connected to a second portion of the band to define a pad segment and wherein a first opening and a second opening are defined in the band. The first opening is dimensioned to receive a forefinger of a user and the second opening is dimensioned to receive a thumb of the user and wherein the pad segment is configured to be positioned adjacent a thenar region of the user.

According to another aspect of the invention, an athletic glove has a cover member having a top portion and a bottom portion cooperating to define a central opening and a plurality of finger elements including a forefinger element and a thumb element configured to receive respective fingers and thumb of a user. The cover member is dimensioned and configured to provide closed distal ends of the finger elements and the thumb element and cover an entire hand of the user. A web space is defined between the forefinger element and the thumb element. A web member is provided having a first portion connected to the forefinger element and a second portion connected to the thumb element wherein the web member is positioned in the web space. The web member further has an extension portion extending into the bottom portion of the cover member.

According to another aspect of the invention, the bottom portion of the athletic glove has a palm portion and the extension portion extends into the palm portion wherein the extension portion is configured to cover a portion of a palm of the hand of the user wearing the batting glove.

According to a further aspect of the invention, the forefinger element defines a first longitudinal axis through a central portion of the forefinger element, the first longitudinal axis extends into the palm portion of the of bottom member, the extension portion extending past the first longitudinal axis.

According to a further aspect of the invention, the plurality of finger elements further includes a middle finger element adjacent the forefinger element, the forefinger element further defines a second longitudinal axis through an end of the forefinger element adjacent the middle finger element that extends into the palm portion of the bottom member, the extension portion extending proximate to the second longitudinal axis.

According to an additional aspect of the invention, the extension member is dimensioned and configured to be positioned over an adductor pollicis muscle of the hand of the user wearing the batting glove.

According to a further aspect of the invention, the thumb element defines a thumb longitudinal axis through a central portion of the thumb element and the extension portion extends into the bottom portion in a direction generally parallel to the thumb longitudinal axis of the thumb element.

According to another aspect of the invention, the web member is generally V-shaped and defining a base wherein the base is positioned in the bottom portion of the cover member.

According to yet another aspect of the invention, the web member has an outer peripheral segment that is integral with the extension portion.

According to a further aspect of the invention, the first portion of the web member is connected proximate a base of the forefinger element and the second portion of the web member is connected proximate a midpoint of the thumb element.

According to a further aspect of the invention, the web member is configured to engage a handle surface of a bat in response to the user gripping the bat and wherein the web member minimizes force against a thenar region of the user's hand in response to the bat hitting a ball. In a further aspect, the web member is configured to engage a curved handle surface of a bat in response to the user gripping the bat wherein the web member is in a curved configuration and in surface-to-surface contact with the curved handle surface of the bat, and wherein the web segment is void of any overlapping upon itself, and wherein the extension member is configured to be positioned between the curved handle surface of the bat and the adductor pollicis muscle of the user, wherein the web member minimizes force against a thenar region of the user's hand in response to the bat hitting a ball.

According to another aspect of the invention, the web member has an outer layer and an inner layer, wherein the outer layer encloses the inner layer. The outer layer is made from a material that is the same as a material of the bottom portion of the cover member. The inner layer is a composite material that is resiliently compressible. In one exemplary embodiment, the inner layer is an energy absorbing composite material having a solid foamed synthetic polymer matrix, and a polymer-based dilatant that is distributed through the polymer of the matrix and incorporated into the polymer of the matrix during formation of the polymer matrix, and a fluid distributed through the matrix. The combination of the matrix, dilatant and fluid provides a composite material that is flexible and resiliently compressible.

According to another aspect of the invention, the bottom portion has a palm portion and the extension portion extends into the palm portion wherein the extension portion is configured to cover a portion of a palm of the hand of the user wearing the batting glove. The forefinger element defines a first longitudinal axis through a central portion of the forefinger element that extends into the palm portion of the of bottom member. The extension portion extends past the first longitudinal axis, wherein the extension member is further configured to cover an adductor pollicis muscle of the hand of the user wearing the batting glove.

According to a further aspect of the invention, the outer layer of the web member comprises a first segment and a second segment. The first segment and the second segment are operably connected together to form a pocket therebetween. The inner layer of the web member is positioned in the pocket. In a further aspect, the first segment and the second segment are connected together between the top portion and the bottom portion by a connection member, the inner layer is positioned within the connection member. The connection member is a thread member stitched through the top portion, first segment, second segment and the bottom portion. In a further aspect, the outer layer of the web member comprises a first segment and a second segment, the inner layer of the web member is positioned between the first segment and the second segment. In a further aspect, the top portion, the first segment, the inner layer, the second segment and the bottom portion are connected together by a stitched thread member.

According to another aspect of the invention, the web member has a pocket defined therein, the pocket having a resiliently compressible insert therein. The resiliently compressible member comprises one of a plurality of resiliently compressible members having different shock absorbing properties wherein one of the plurality of resiliently compressible members is positioned in the pocket.

According to another aspect of the invention, the inner layer is an energy absorbing composite material having a solid foamed synthetic polymer matrix, and a polymer-based dilatant that is distributed through the polymer of the matrix and incorporated into the polymer of the matrix during formation of the polymer matrix, and a fluid distributed through the matrix. The combination of the matrix, dilatant and fluid provides a composite material that is flexible and resiliently compressible.

According to another aspect of the invention, the web member has a thickness in the range of approximately 0.05 inch to approximately 0.25 inch.

According to a further aspect of the invention, the web member is an energy absorbing material having a foam base, and a polymer based material operably associated with the foam base. The polymer based material has dilatant properties having molecules that in a first state move freely within the foam base wherein the web member is flexible and in response to an impact, the molecules lock together to define a second state wherein the molecules lock together wherein the web member is less flexible. After impact, the molecules again move freely within the foam base in the first state.

According to a further aspect of the invention, the web member has a tapered thickness wherein the thickness decreases from a base portion towards an outer peripheral segment.

According to another aspect of the invention, the web member defines a base and an outer peripheral segment opposite the base, the top portion defining a curved wall that extends from a first end of the outer peripheral segment, around the base, and to a second end of the outer peripheral segment. The curved wall has a greater height dimension proximate the base of the web member than a height dimension at the first end and the second end of the outer peripheral segment of the web member. In addition, the curved wall has a maximum height dimension proximate the base of the web member wherein the height dimension of the wall tapers down towards the first end and the second end of the outer peripheral segment of the web member.

According to a further aspect of the invention, a top surface of the web element and the curved wall cooperatively define a recessed compartment proximate the top portion.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 6 is a side elevation view of the batting glove shown in FIG. 5;

FIG. 7 is another side elevation view of the batting glove in FIG. 5;

FIG. 8 is an underside perspective view of the batting glove shown in FIG. 5 and also showing an alternative embodiment feature of the invention;

FIG. 8A is an end elevation view of the batting glove shown in FIG. 5 and showing a web element positioned between a forefinger element and a thumb element;

FIG. 8B is a schematic cross-sectional view of the web element of the present invention and having a variable thickness;

FIG. 8C is a schematic cross-sectional view of the web element that utilizes an inner layer and an outer layer;

FIG. 16 is a perspective view of a cushioning apparatus according to another exemplary embodiment of the present invention;

FIG. 17 is a perspective view of the cushioning apparatus of FIG. 16 shown in a fastened configuration;

FIG. 18 is top perspective view of the cushioning apparatus and with a slightly larger band;

FIG. 19 is a perspective view of the cushioning apparatus in the fastened configuration;

FIG. 20 is a perspective view the cushioning apparatus being placed in a fastened configuration;

FIG. 31A is a partial side elevation view of the batting glove of FIG. 26 and showing an alternative embodiment of the web member in cross-section;

FIG. 31B is a partial side elevation view of the batting glove of FIG. 26 and showing a further alternative embodiment of the web member in cross-section;

DETAILED DESCRIPTION OF THE PREFERRED EMBODIMENT

Figure 1:
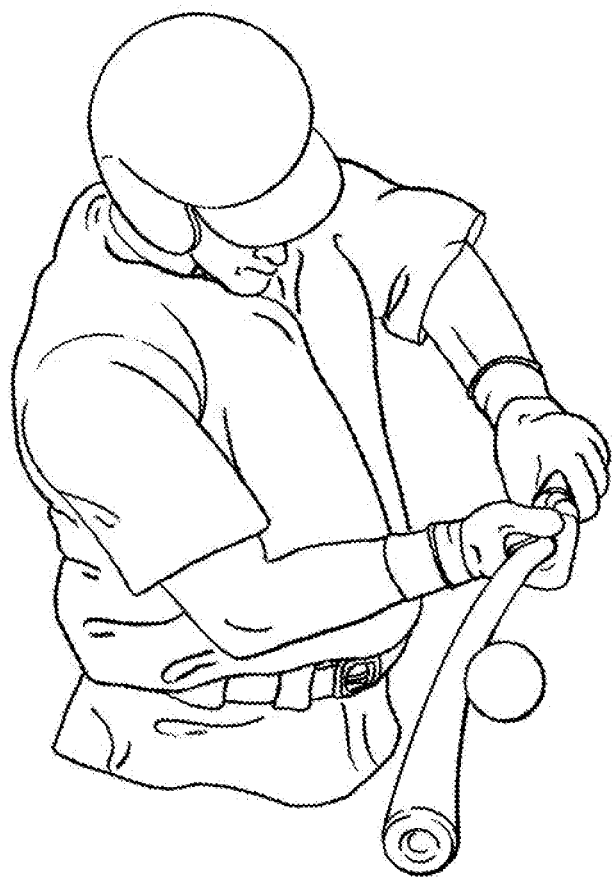
FIG. 1 is a partial perspective view of a baseball player swinging a bat and hitting a ball towards a central portion of the bat.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 3:
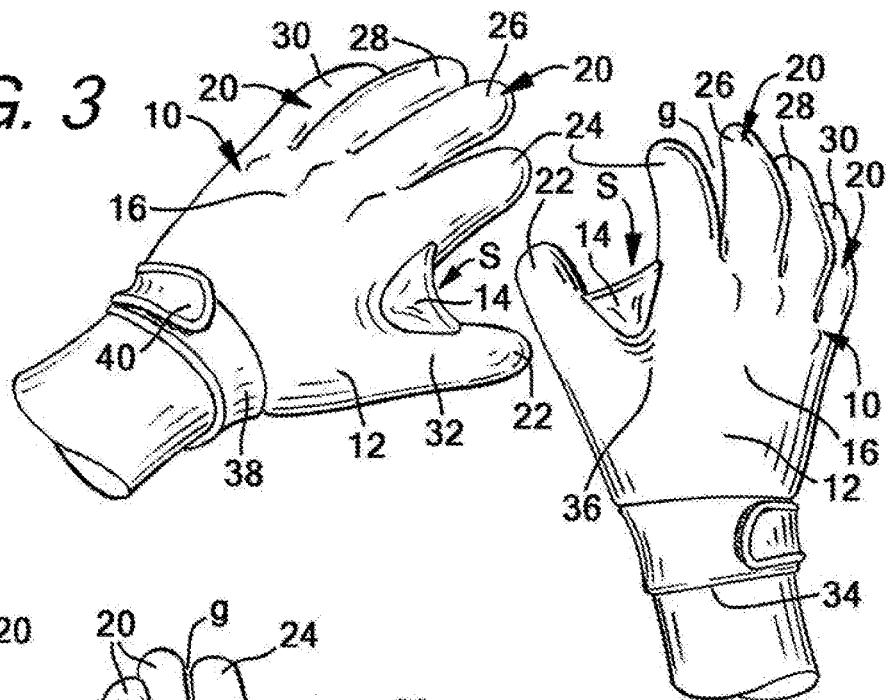
FIG. 3 is a top perspective view of a pair of batting gloves according to an exemplary embodiment of the present invention.
Figure 4:
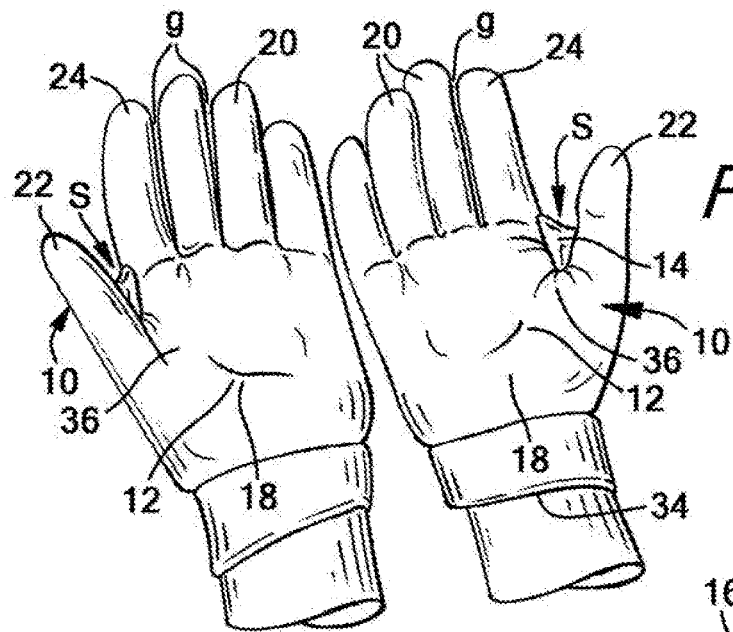
FIG. 4 is an underside perspective view of the pair of batting gloves shown in FIG. 3.
Figure 5:
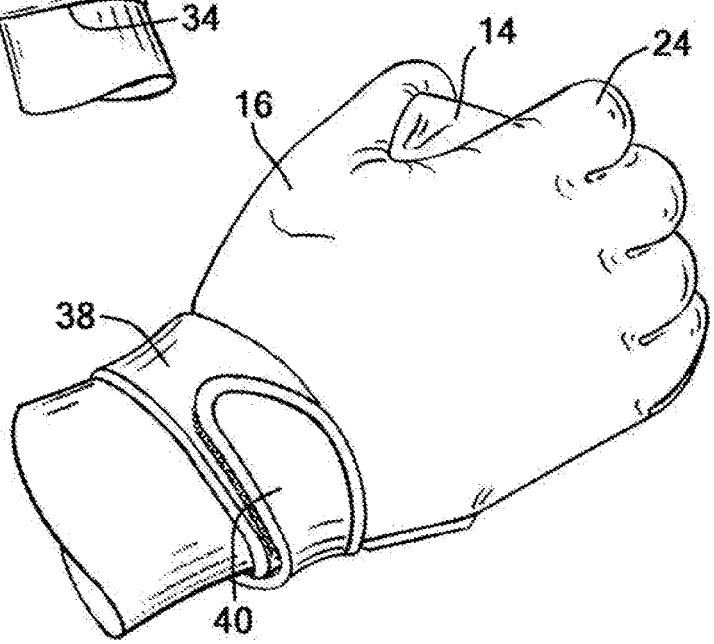
FIG. 5 is a perspective view of a right hand batting glove from the pair of batting gloves shown in FIG. 3.

Referring to the drawings, FIGS. 3 and 4 disclose a pair of athletic gloves in the form of baseball/softball batting gloves, and generally designated with the reference numeral 10. It is understood that the present invention is utilized in a single batting glove 10. In certain exemplary embodiments, an athlete may wear a glove 10 in each hand and wherein each glove 10 incorporates the invention. For simplicity, the invention will generally be described with respect to a single batting glove 10 with the understanding that the features described with respect to one glove 10 will be generally applicable to the other glove 10 as the structures and features are generally symmetrical between a right-hand batting glove and a left-hand batting glove.

As further shown in FIGS. 3-8, the batting glove 10 generally includes a cover member 12 and a web member 14, or web element 14, operably connected to the cover member 12. As explained in greater detail below, it is understood that the web member 14 may be considered an integral portion of the cover member 12 or separately connected to the cover member 12. The web member 14 may further be configured to be removably attached to the cover member 12.

The cover member 12 is generally a typically constructed batting glove. Thus, the cover member 12 has a top portion 16 and a bottom portion 18 that cooperate to define additional parts of the batting glove 10 such as receiving portions or receiving stalls for receiving various portions of the hand. It is understood that the top portion 16 may be connected to the bottom portion such as by sewing to define a junction between the portions 16,18. The cover member 12 defines a plurality a finger elements 20 or finger sections 20 and a thumb element 22 or thumb section 22. In particular, the finger elements 20 include a forefinger element 24, a middle finger or long finger element 26, a ring finger element 28 and a little finger element 30. The cover member 12 has gaps g generally located between the finger elements 28 as well as a web space S generally located between the forefinger element 24 and the thumb element 22. The web space S may also be referred to as a thenar space. The forefinger element 24 and thumb element 22 further define a curved segment 32 (FIGS. 6-8). In particular, an inner portion of the forefinger element 22 transitions to an inner portion of the thumb element 22 in a curved fashion and forms a generally U-shape or parabolic shape. The curved segment 32 includes the area defined at the juncture of the top portion 16 and the bottom portion 18 (e.g., a seam area) generally from the forefinger element 24 and extending around to the thumb element 22. Thus, it is understood from FIGS. 3-8 that the top portion 16 may be sewn to the bottom portion 18 wherein the juncture of the portions 16,18 would generally be at a midpoint of the heights of the finger element as may be appreciated from FIG. 8A. The curved segment 32 is at the juncture of the top portion 16 and the bottom portion 18. Furthermore, the forefinger element 24 and thumb element 22 cooperatively define heights that generally define a plane P (FIG. 8A) wherein the web element 14 is generally positioned within the plane P as will be described in greater detail below. The top portion 16 is configured to cover a back of the hand and the bottom portion 18 is configured to cover a palm of the hand. The cover member 12 further defines a central opening 34 for entry of the hand when wearing the batting glove 10.

The top portion 16 and bottom portion 18 of the cover member 12 have confronting segments 36 that cover the thenar region of the wearer's hand. The curved segment 32 may be considered to also extend between the confronting segments 36 and into portions of the respective cover members 16,18 that cover the thenar region of a wearer's hand. In one exemplary embodiment, the confronting segment 36 of the bottom portion 18 is void of additional padding or cushioning and is merely comprised of the material of the cover member 12 at that location (FIG. 8). Alternatively, additional cushioning or padding could be used as well as at other areas of the cover member 12. It is further understood that the cover member 12 can be made from several different materials including leather or synthetic materials. The cover member 12 may be made from Spandex materials, Lycra materials, nylon materials, or other resilient materials, or combinations of such materials. For example, the bottom portion 18 may be made from leather or similar material while the top portion 16 may be made from elastic and breathable type materials. It is also understood that the inside of the cover member 12 may employ soft materials such as cotton at selected areas for additional comfort. It is further understood that the cover member 12 could include an elastic band 38 attached proximate the central opening 34. The elastic band 38 includes a fastener mechanism 40 typically in the form of a hook and loop fastener to wrap around a human wrist.

As further shown in FIGS. 3-8, the web member 14 is generally a flexible, elastic, resilient member in one exemplary embodiment. The web member 14 is generally positioned between the thumb element 22 and the forefinger element 24 and generally adjacent to the confronting segments 36 and portions 16,18 of the cover member 12. The web member 14 further occupies at least a portion of the web space S. In an exemplary embodiment, the web member 14 extends away from the curved segment 32 of the cover member 12 and extends substantially into the web space S. The web member 14 has a curved portion 42 that generally corresponds to the curved segment 32 defined by the outer portion of the forefinger element 24 and the thumb element 22, and is thus a U-shaped or parabolic shaped segment. The curved portion 42 may be considered to comprise a base portion 43 that is proximate to the cover member 12 of the glove 10. A distal, outer peripheral segment 44 of the web member 14 opposite the curved portion 42 is generally a linear segment having a first end 46, or first portion, contacting the forefinger element 24 and a second end 48, or second portion 48, contacting the thumb element 22. These contact points can be proximate a midpoint of the thumb element 22 and just under a midpoint of the forefinger element 24. The web member 14 can vary in size wherein these contact points could extend to various points on the thumb element 22 and forefinger element 24. Generally, however, the web member 14 has a first portion connected to the forefinger element 24 and a second portion connected to the thumb element 22.

Figure 2:
FIG. 2 is a partial perspective view of a baseball player swinging a bat and hitting a ball towards an end of the bat.
Figure 12:
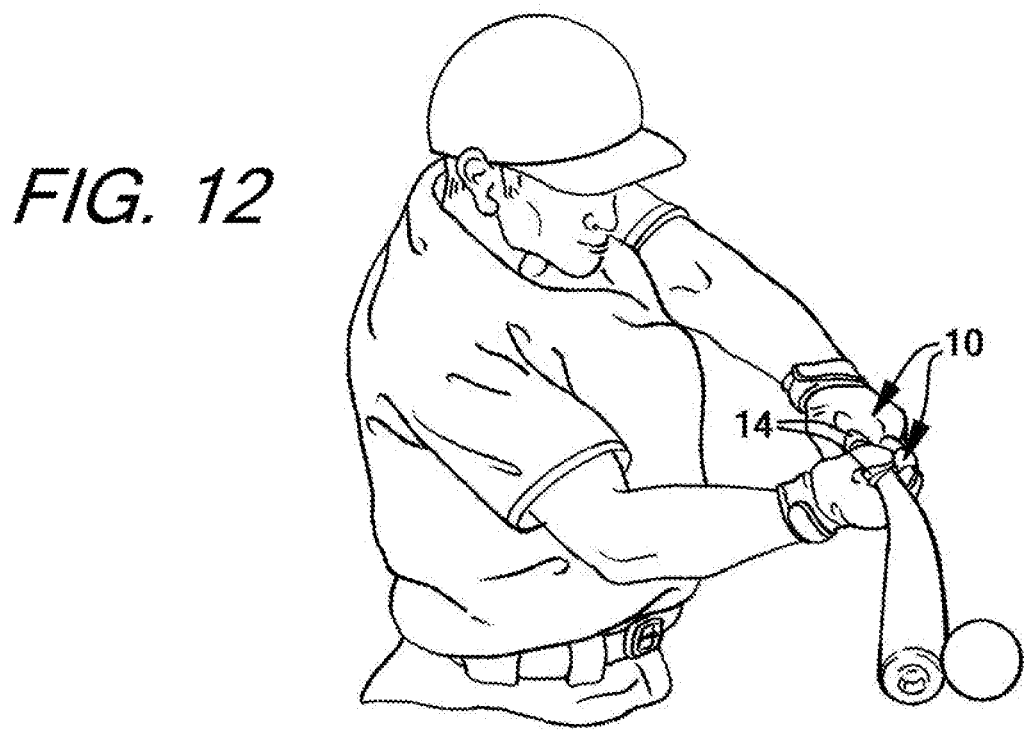
FIG. 12 is a partial perspective view of a baseball player wearing the batting gloves of FIG. 3, swinging a bat and hitting a ball towards an end of the bat.

The curved portion 42 of the web element 14 is operably connected to the cover member 12 at the curved segment 32 of the cover member 14. The operable connection can take many different forms including sewing, adhesives, heat bonding, welding or other types of fastening methods. In an exemplary embodiment, the web member 14 is connected at the juncture of the top portion 16 and bottom portion 18 of the cover member 12. Thus, the web member 14 extends into the web space S from this juncture that generally also defines the curved segment 32 of the cover member 12. As can be appreciated from FIG. 8A, the juncture may be generally proximate a midpoint of the respective heights of the forefinger element 24 and the thumb element 22. The web member 14 is dimensioned such that the web member 14 is in a generally planar or slightly curved relaxed state with the forefinger element and thumb element are at a typical distance apart represented such as when a hand is at a comfortable rested position. Accordingly, as shown in FIGS. 6-8, the web member 14 has a generally U-shape extending between the forefinger element 24 and the thumb element 22. The web member 14 may be considered to have the base portion 43 proximate the curved segment 32 of the cover member 12 of the glove 10 and the distal outer peripheral segment 44 opposite and remote from the base portion 43. It is further understood that in another exemplary embodiment, the web element 14 can have one portion connected to the thumb element and another portion connected to a finger element 20 that could include other finger elements such as the middle finger element 26, the ring finger element 28 or the little finger element 20. In addition to providing cushioning against the thenar region of the wearer's hand, such construction can minimize the sting sometimes experienced in the fingers such as when hitting a ball at an end of the baseball bat (FIGS. 2 and 12).

As discussed, the size of the web member 14 can vary wherein the farther along the web member 14 is connected to the forefinger element 24 and the thumb element 22 the larger the size of the web member 14. In certain exemplary embodiments, the distance from an apex area or base portion 43 of the curved portion 42 to the outer peripheral segment 44 could be approximately 1 inch. In a further exemplary embodiment, the distance may be 1⅛ inches. Other exemplary embodiments can have a distance from approximately ¼ inch to 2-3 inches. The web member 14 extends substantially into the web space S away from the curved segment 32 of the cover member 12. In additional exemplary embodiments, the central portion of the web member 14 may extend from approximately ¼ inch to approximately 1 inch, while outer portions of the web member 14 extend respectively further up on the forefinger element 24 and the thumb element 22. In such configuration, the web member 14 has a more pronounced, deeper and more narrow U-shape or parabolic shape. As discussed, the web member 14 extends into the web space S from the curved segment 32 at the juncture of the top portion 16 and the bottom portion 18. As discussed and shown in FIG. 8A, the forefinger element 24 and thumb element 22 define the plane P wherein the web element 14 is generally positioned within the plane P. The plane P could also be considered to correspond to the respective heights of the forefinger element 24 and thumb element 22 and wherein the web element 14 resides within the heights of the elements 22,24. The web element 14 further occupies the web space S in the plane P. Thus, the unique connection of the web element 14 to the cover member 12 (e.g., the connection of the curved portion 42 to the curved segment 32 generally at the juncture of the portions 16,18) provides for the extension of the web element 14 from the cover member 12 and positions the web element 14 in the plane P and web space S. The structure and configuration of the web element 14 and its operable connection to the cover member 12 provides benefits to the wearer regarding protection and comfort to the thenar region of the hand as described in greater detail below.

As further shown in FIGS. 6-8, the web member 14 may have a generally uniform thickness. In a further exemplary embodiment, the web member 14 may have a variable thickness. For example, as shown in FIG. 8B, the web member 14 may have a greater thickness proximate the base portion 43 where the thickness decreases towards the outer peripheral segment 44. This could also be reversed wherein the web member 14 has a greater thickness proximate the outer peripheral segment 44. Thickness configurations may depend on the particular desires of the athlete wearing the glove 10. In certain exemplary embodiments, the web member may have a thickness of approximately 0.060 inch. The thickness could be in a range of approximately 0.050 inch to approximately 0.25 inch.

The web member 14 further has a certain level of tackiness. In one exemplary embodiment, the web member may be considered "sticky" to the touch which will enhance performance as described in greater detail below. Thus, the web member 14 may be made from materials that provide a tacktified surface. The web member 14 may be considered to have frictional characteristics. Thus, the web member 14 may be made from materials having various hardness ranges and durometer properties.

In one exemplary embodiment, the web member 14 may be made from a composite or multi-layered material such as an elastic fabric base material covered by a vinyl material. Such composite material allows for a certain amount of stretch and resiliency, and the vinyl further allows for a certain amount of tackiness. As explained in greater detail below, this combination of characteristics allows for enhanced engagement with the handle of a baseball bat. FIG. 8C discloses an example of a multi-layered material used in the web element 14 in an exemplary embodiment of the invention. The web element 14 has an outer layer 14A that is made from a material that provides a tacktified surface such as a combination of silicone and neoprene in an exemplary embodiment. The web element 14 has an inner layer made of a leather material 14B that provides for a desired amount of elasticity but prevents overstretching. The outer layer 14A further promotes the desired amount of elasticity and further provides comfort, feel and grip enhancement for the implement being held such as the baseball bat. It is desirable for the web element 14 to stretch the desired amount and to further maintain its elastic properties throughout the useful life of the glove. It is further understood that the web member 14 could be made from a single layer of material that provides a tacktified surface.

Figure 10A:
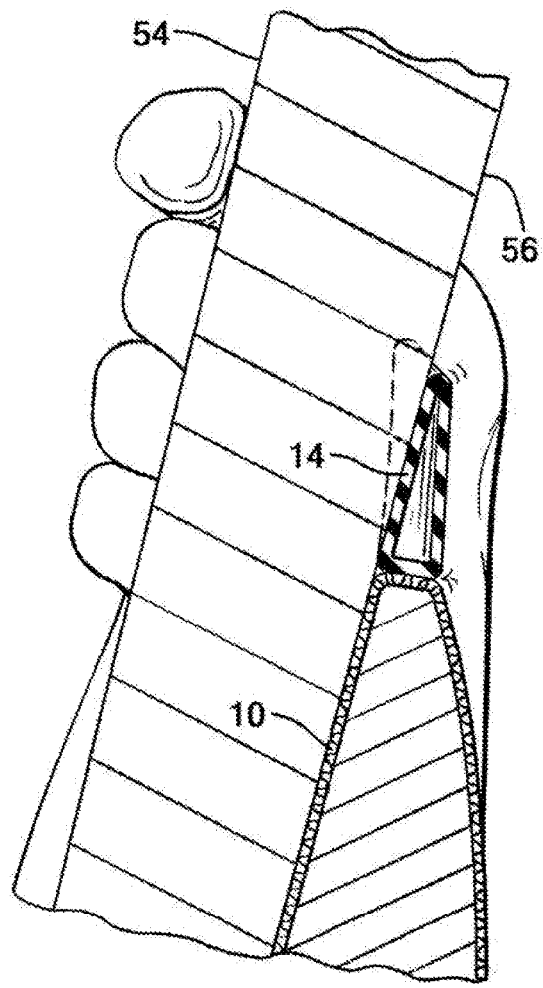
FIG. 10A is a schematic partial cross-sectional view of a user wearing the batting glove of FIG. 3 and gripping a handle of a baseball bat.

The web member 14 may be made from other materials including but not limited to rubber, silicone, vinyl, other types of polymer materials as well as Spandex, Lycra and Nylon. Other synthetic polymers could also be used such as neoprene. It is also understood the size of the web member as well as the material can be selected to provide a desired amount of tension around a bat handle. It is further contemplated that the tension around the bat handle can be adjustable to customize the feel for the athlete. In one exemplary embodiment, the web element 14 is made from a silicone material, a neoprene material or a combination of silicone material and neoprene material. Such a combination can provide a tacktified surface. The element has a first member and a second member confronting the first member and defining a pocket between the members (FIG. 10A). This construction of the web element 14 shown in FIG. 10A provides an enhanced comfort level, cushioning level and grip enhancement to an athlete holding an implement such as a baseball bat. Alternatively, the web element can be a solid member (FIG. 8B). The web element 14 in this exemplary embodiment is connected to the cover member 12 as described above. In yet a further exemplary embodiment, the web member 14 could be a member generally resistant to stretching such as a leather member.

In a further exemplary embodiment, the web member 14 may define a pocket therein. The pocket can be filled with a variety of different inserts in the form of cushioning members having various thicknesses, hardness, resiliency and other desired properties. Thus, the inserts can have different levels of cushioning properties or durometers. The cushioning members could be rubber members, foam members, gel members, putty members, silicone members, air-filled pillows or inflatable bellows members. The web member 14 may define an opening 50 (FIG. 8) such as at the outer peripheral segment 44 wherein the cushioning member inserts 52 may be inserted through the opening and contained in the web member 14. In one exemplary embodiment, the insert 52 may be a silicone material having a generally soft durometer. In such configuration, the web member 14 can have various cushioning properties to be customized to the particular athlete's desires for protection, comfort and performance. It is understood that the pocket could extend to the junction of the cover member 16,18 or at the curved portion 42 or base portion 43. In yet another exemplary embodiment, it is understood that the web element 14, such as the construction shown in FIG. 10A, could be operably connected to an inflation device to provide a customized level of compressed air into the web element 14 to provide a cushioning member. The inflation device could be an external device but also be incorporated into the construction of the cover member 12 of the glove 10.

Figure 9:
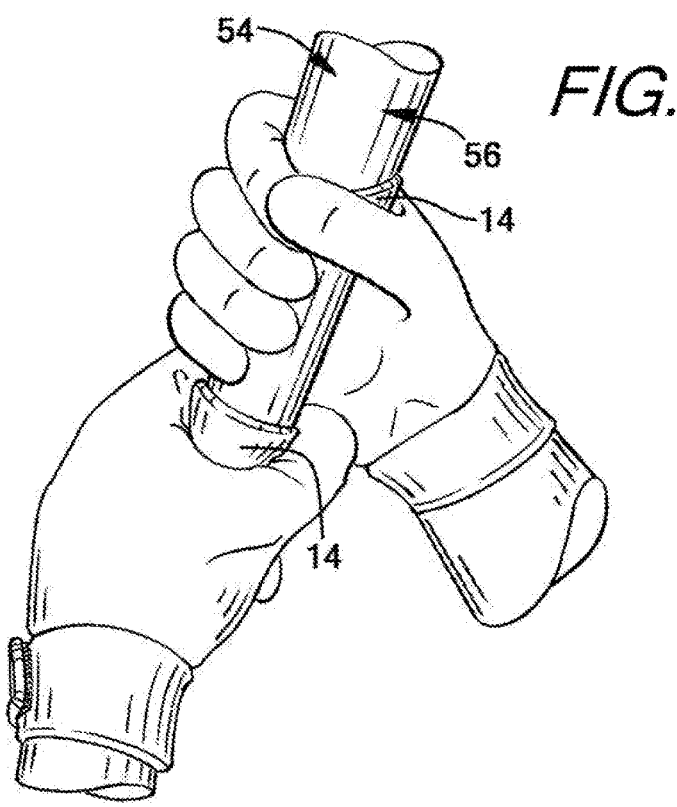
FIG. 9 is a perspective view of a wearer of the batting gloves of FIG. 3 and gripping a bat.
Figure 10B:
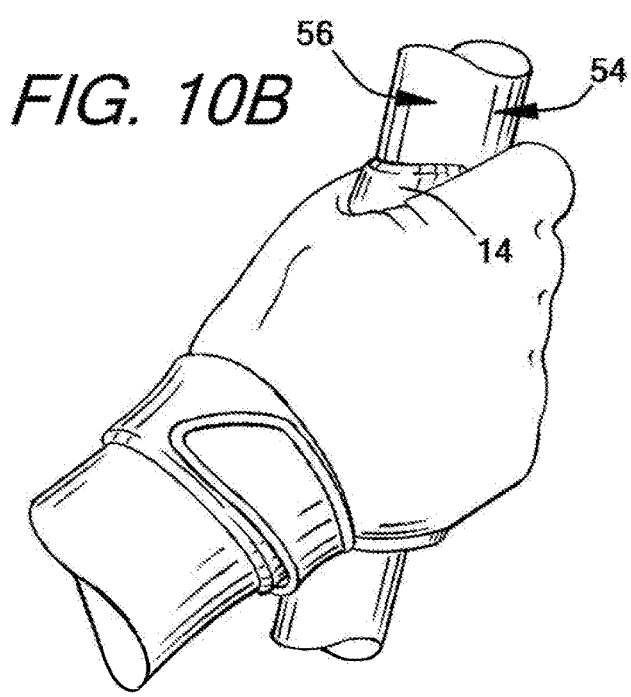
FIG. 10B is a perspective view of the wearer of the right hand glove and gripping a bat.
Figure 11:
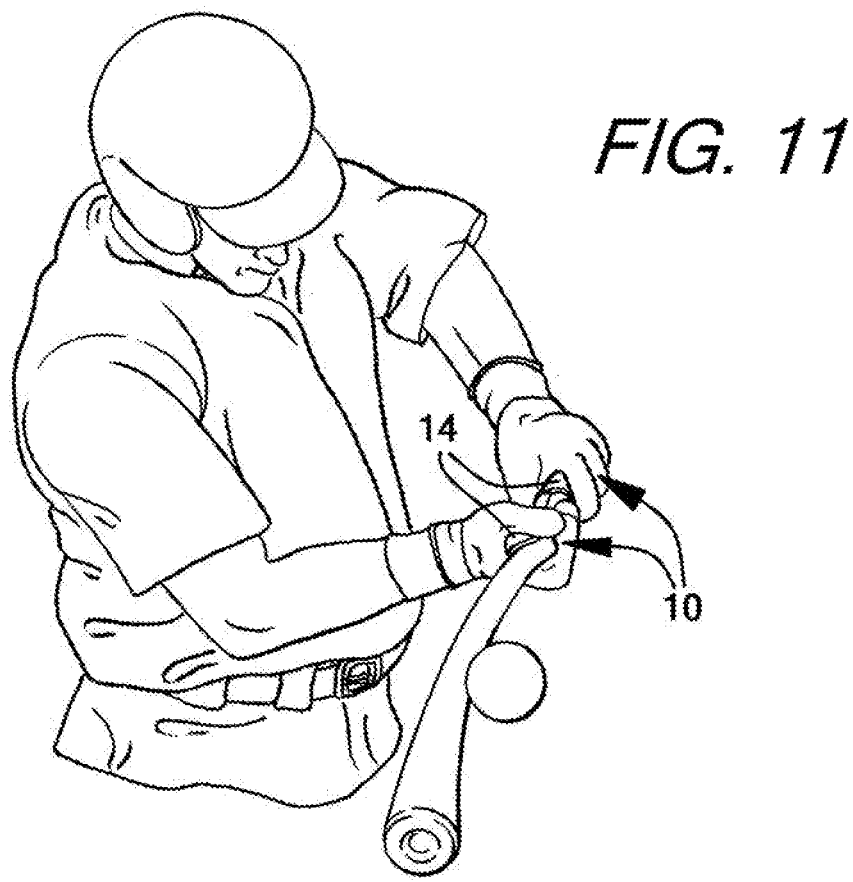
FIG. 11 is a partial perspective view of a baseball player wearing the batting gloves of FIG. 3, swinging a bat and hitting a ball towards a central portion of the bat.

In use, a baseball player may typically wear a batting glove on each hand. As shown in FIGS. 9 and 10A-B, when holding and gripping the bat 54, the bat handle 56 rests generally in the palm portion of the hands and ideally, more towards where the fingers meet the palm. When the player grips the bat 56, the web member 14 smoothly wraps around the circumference of the bat handle 56. In an exemplary embodiment, there is a certain amount of stretch of the web member 14 around the bat handle 56. As further shown, the web member 14 is placed in a curved configuration and is in surface-to-surface contact with the bat handle 56. The web member 14 is not "scrunched" or unevenly pressed against the bat or hand. The web member 14 does not overlap upon itself when engaged with the baseball bat. Thus, the web member 14 is void of any creases, wrinkles or overlaps providing a comfortable grip of the bat 54. This smooth, surface-to-surface contact with the bat handle implement extends from the curved portion 42, or base portion 43, to the distal outer peripheral segment 44. The web member 14 forms a tight engagement against the bat handle 56. The connection of the web member 14 at the junction of the top portion 16 and bottom portion 18 and curved segment 32 assists in the web member 14 being in position to be comfortable against the bat handle implement and provide the cushioning and shock absorption as described herein. In addition, the tackiness of the web member 14 assists in providing a firm grip of the bat 54. The material selection for the web member 14 further provides for a proper amount of stretching around the bat handle 56 and enhanced gripping of the bat handle 56. In this configuration, the web member 14 is also placed against the thenar region of the hand. This configuration can be appreciated from FIG. 10A wherein the web element 14 provides an intermediary between the bat handle and the wearer's hand. As further can be appreciated from FIGS. 10A and 11-12, the web member 14 minimizes, cushions and dissipates force created in response to the player swinging the bat 54 and hitting a ball with the bat. Because of the material construction of the web member 14 and smooth planar-to-planar contact between the web member 14 and the handle 56 of the baseball bat 54, the player experiences a good comfortable grip that also minimizes force impacts into the thenar region of the hand from hitting a ball with the bat 56. For example, as shown in FIGS. 11 and 12, the web member 14 provides comfortable cushioning to thenar regions of the hands when hitting a ball even if the athlete is "jammed" (FIG. 11) and further provides comfortable cushioning if the athlete hits the ball at the end of the bat (FIG. 12).

Figure 13:
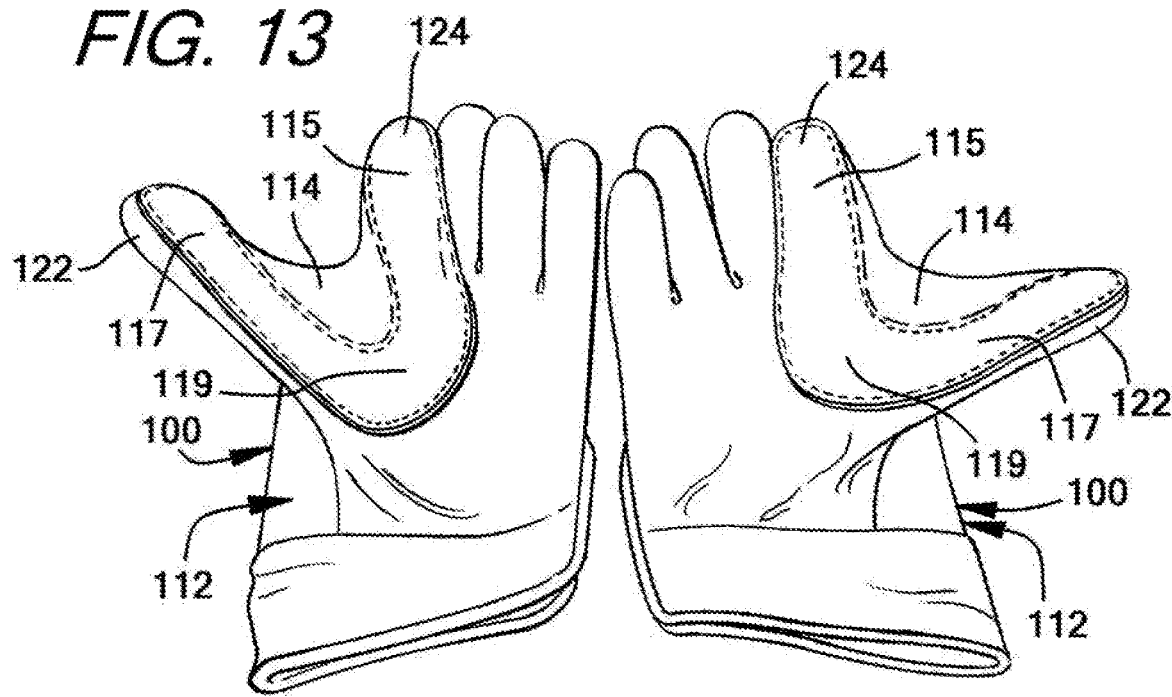
FIG. 13 is a top perspective view of a pair of batting gloves according to an alternative exemplary embodiment of the present invention.
Figure 14:
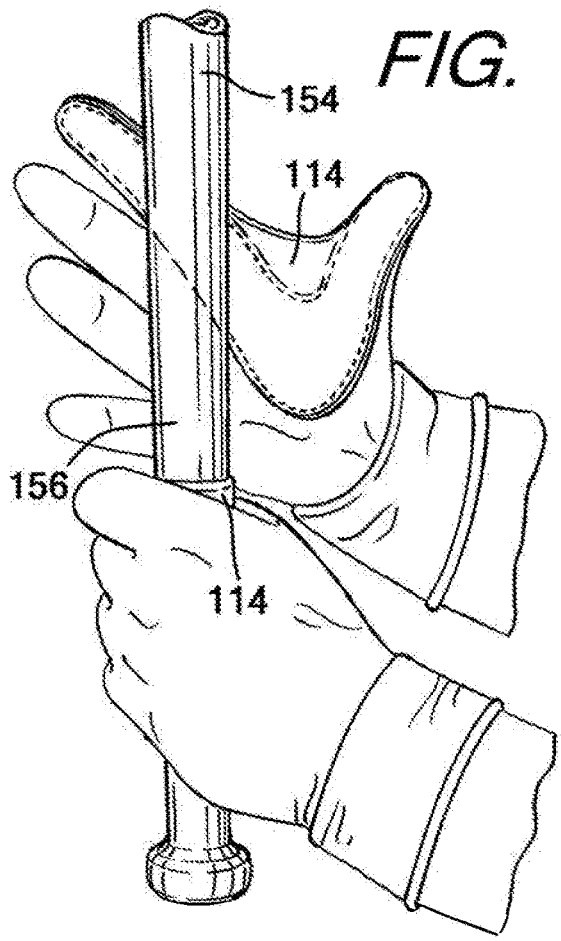
FIG. 14 is a partial perspective view of a wearer of the batting gloves shown in FIG. 13 gripping a bat.
Figure 15:
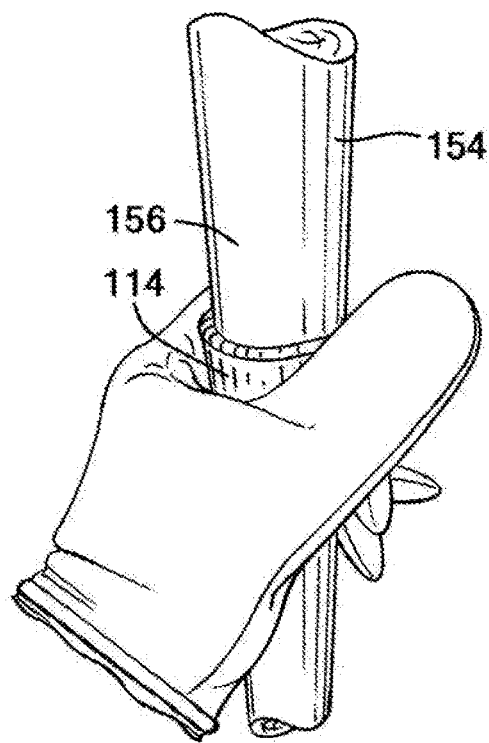
FIG. 15 is a perspective view of the wearer of the left hand glove and gripping a bat.

FIGS. 13-15 show another exemplary embodiment of batting gloves of the present invention. The batting gloves in FIGS. 13-15 are similar to the batting gloves in FIGS. 3-12, and like structures will be referenced with like reference numerals in a 100 series. Additional features of the batting gloves will be described further below.

As shown in FIG. 13, the batting gloves 100 have a cover element 112 and a web member 114. The web member 114 is similar to the web member 14 of FIGS. 3-12 and generally extends between the forefinger element 124 and the thumb element 122. The web member 114 has extended features wherein the web member 114 has a first extension portion 115 that extends over the forefinger element 124, a second extension portion 117 that extends over the thumb element 122, and a central extension portion 119 that extends further into the confronting elements of the cover element 112 that would correspond to the thenar region of the hand. In particular, the central extension portion 119 extends into palm area of the bottom portion 118 of the cover element 112.

Similar to the previous embodiment described above, the athlete wears the gloves 100 and grips an implement such as a baseball bat. As shown in FIGS. 14 and 15, the web member 114 wraps around the handle 156 of the baseball bat 154 wherein the web member 114 is in general surface-to-surface contact with the handle 156 of the baseball bat 154. Similar to the web element 14 of FIGS. 3-12, the web member 114 functions to minimize the force impacts to thenar regions of the hands created in response to the athlete swinging the bat and hitting a ball.

In the embodiments of the web member 14 of FIGS. 3-12 and the web member 114 of FIGS. 13-15, the web members 14,114 are generally integral with the batting gloves 10,100. It is understood that the web member 14,114 could be configured as a separate component that could be removably attached to the batting gloves 10,100.

FIGS. 16-23 disclose an additional exemplary embodiment of a cushioning apparatus or hand protection device designed to be used by an athlete such as when swinging a baseball bat to hit a ball. This embodiment is not an integral part of a batting glove, and is used either in conjunction with a batting glove or without a batting glove.

FIGS. 16-23 disclose the embodiment of a cushioning apparatus of the present invention, generally designated with the reference numeral 200. As described in greater detail below, the cushioning apparatus 200 can be used on its own or in conjunction with a batting glove. As shown in FIGS. 16-18, the cushioning element 200 generally includes an annular band member 202 and a fastener 204. As explained in greater detail below, the cushioning element 200 is moveable between a first configuration that represents an annular ring-shaped configuration (FIG. 16) and a second configuration that represents a fastened configuration (FIG. 17).

As further shown in FIGS. 16-18, the annular band member 202 is in a ring-shape and dimensioned to be capable of being worn on a wrist of a user. It is understood that this annular, ring-shape represents the first configuration. The annular band member 202 has a first protrusion 206 and a second protrusion 208 located generally opposite the first protrusion 206, e.g., generally 180 degrees apart on the band member 202. The protrusions 206,208 have a curved peripheral surface 210. The annular band member 202 may have an additional pad member 211 located proximate each protrusion 206,208.

The cushioning apparatus 200 further has the fastener 204 operably connected to the annular band member 202. The fastener 204 has a first fastener member 212 located at first location on the annular band member 202. The fastener 204 also has a second fastener member 214 located at a second location on the annular band member 202, generally opposite the first location, e.g., generally 180 degrees apart on the band member 202. In one exemplary embodiment, the fastener 204 is a hook and loop fastener wherein one of the first fastener member 212 and the second fastener member 214 is a hook member and the other of the first fastener member 212 and the second fastener member 214 is a loop member. As will be described further, the first fastener member 212 is capable of being removably attached to the second fastener member 214. It is understood that the fastener 204 could take other forms including snaps, snap fit mechanisms, button arrangements, interference fits, sliding fasteners and other fastener types. It is understood that the fastener members 212,214 could be placed on outer portions of the band member 202 or inner portions of the band member 202.

Figure 21:
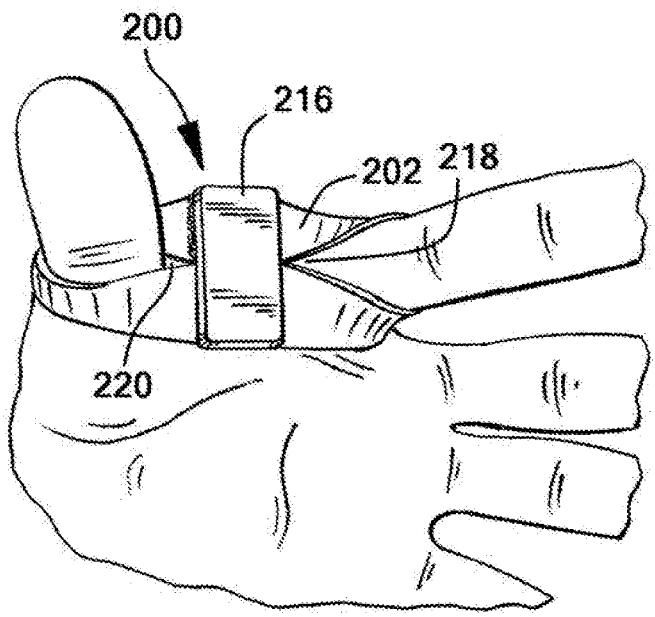
FIG. 21 is a perspective view of the cushioning apparatus in the fastened configuration and worn by a wearer.
Figure 22:
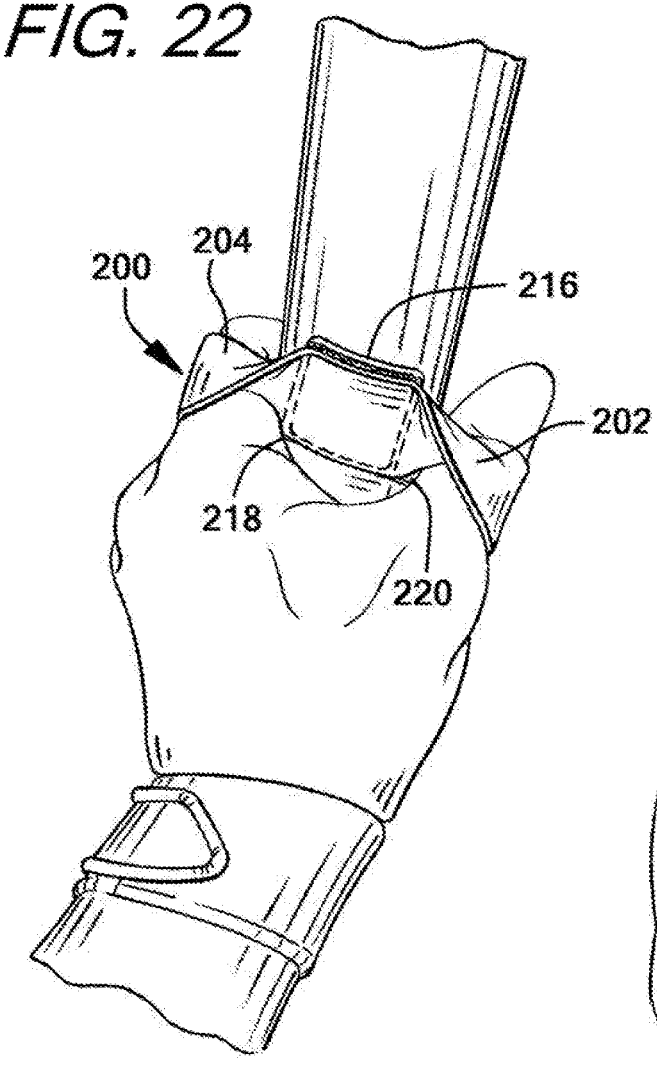
FIG. 22 is a partial perspective view of a wearer with a batting glove and with the cushioning apparatus worn over a batting glove and the wearer gripping a bat.
Figure 23:
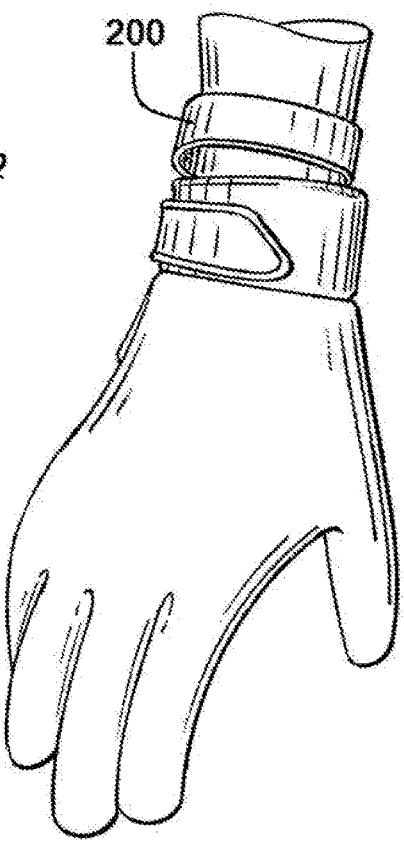
FIG. 23 is a perspective view of the cushioning apparatus in an annular configuration and worn on a wrist of the wearer.

As shown in FIG. 23 and can be appreciated from FIGS. 16 and 18, the annular band member 202 has the first configuration wherein the band member 202 is worn on the wrist of the user. FIGS. 17 and 19-22 show the band in the second configuration that represents a fastened configuration. Thus, a user activates the fastener 204 and places the first fastener member 212 in contact with the second fastener member 214 to connect the members 212,214. Thus, a first portion of the band 202 is connected to a second portion of the band 202. This connection defines a pad segment 216. The connection further defines a first opening 218 and a second opening 220 in the band 202. In use as shown in FIG. 21, the first opening 218 is dimensioned to receive to receive a forefinger of a user and the second opening 220 is dimensioned to receive a thumb of the user and wherein the pad segment 216 is configured to be positioned adjacent a thenar region of the user and the skin connecting the forefinger and the thumb. As can be appreciated from the discussion above and from FIG. 22, the cushioning apparatus 200 can also be worn over a traditional batting glove wherein the pad segment 216 would engage the surface of the bat handle and minimize force impacts created in response to the user swinging the bat and hitting a ball. In this configuration, the pad segment 216 is placed against the surface of the bat handle. When the user is done hitting a ball, the apparatus 200 can be returned to the first configuration wherein the fastener members 212,214 are separated and the annular band member is in ring form. The apparatus 200 can then be worn comfortably on the wrist as shown in FIG. 23. It is appreciated that the pad segment 216 can take different configurations when the band 202 is in the fastened configuration such as shown in FIG. 17 and FIG. 19. Regardless, the pad segment 216 is configured to engage the handle of the bat and protect the thenar region of the wearer's hand. It is further understood that the pad segment 216 could be designed to have a pocket to receive additional cushioning inserts such as described above. The apparatus 200 may be dimensioned to accommodate different sizes of fingers and thumbs of different users. The material in the apparatus 200 can be any suitable flexible material, including but not limited to, silicone, polyurethane, polyethylene, elastic, spandex, rubber, latex, plastics, cotton, polyester, leather or any combination thereof. As discussed, the apparatus 200 can be used over a hand without wearing a batting glove.

FIGS. 24-46 disclose another exemplary embodiment of the athletic glove(s) according to the present invention. The athletic glove(s) of FIGS. 24-46 are similar to the gloves of the previous embodiments and are designated with the reference numeral 310. Similar structures will be designated with like reference numerals in a 300 series. Additional features of the athletic glove(s), which may be referred to as batting gloves 310, will be described further below. The previous descriptions of the gloves 10,100 can apply to the gloves 310 of FIGS. 24-46.

Figure 24:
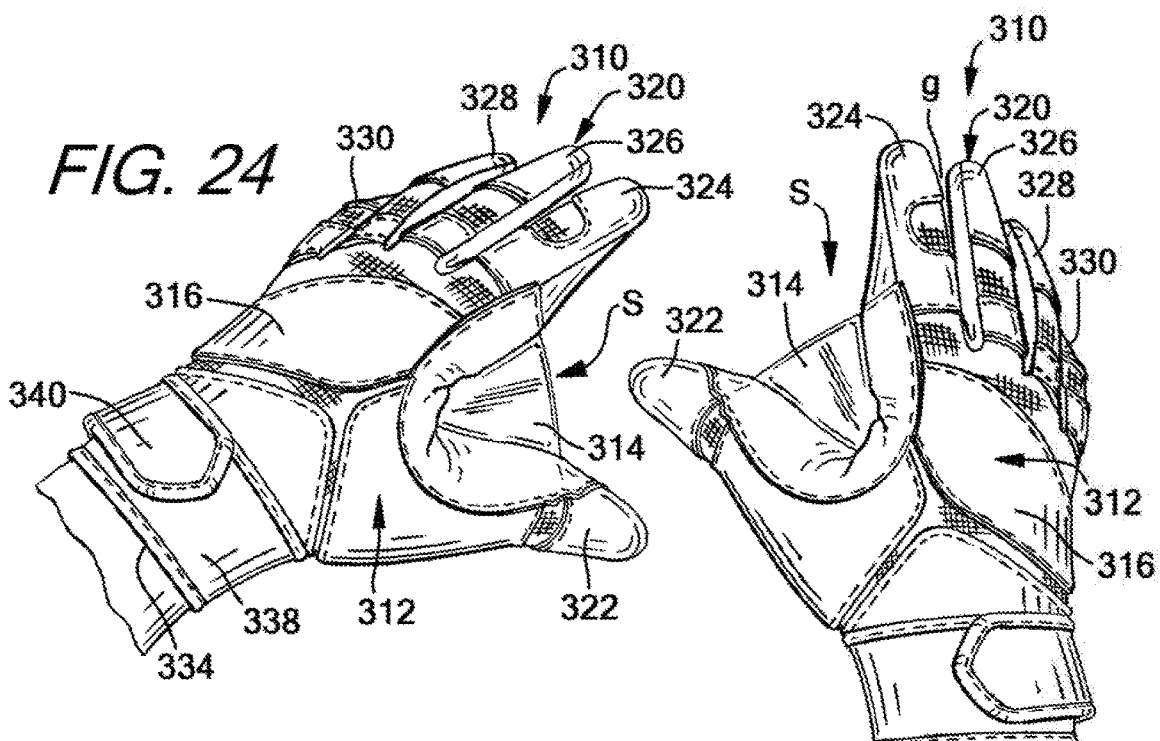
FIG. 24 is a top perspective view of a pair of batting gloves according to another exemplary embodiment of the present invention.

As further shown in FIGS. 24-28, the batting glove 310 generally includes a cover member 312 and a web member 314, or web element 314, operably connected to the cover member 312. As explained in greater detail below, it is understood that the web member 314 may be considered an integral portion of the cover member 312 or separately connected to the cover member 312. The web member 314 may further be configured to be removably attached to the cover member 312. FIG. 24 shows a pair of batting gloves 310 wherein each batting glove 310 has a web member 314. A wearer/user may wear/use the batting gloves 310 as shown in FIG. 24. It is further understood that a player may wear a batting glove 310 with a web member 314 on only a top hand batting glove for batting or hitting. Thus, a right-handed hitter may use a right-hand batting glove having the web member 314 (the top hand for right-handed hitters) and a left-hand batting glove (the lower hand) that does not utilize the web member 314. Conversely, a left-handed hitter may use a left-hand batting glove having the web member 314 (the top hand for left-handed hitters) and a right-hand batting glove (the lower hand) that does not utilize the web member 314.

Figure 25:
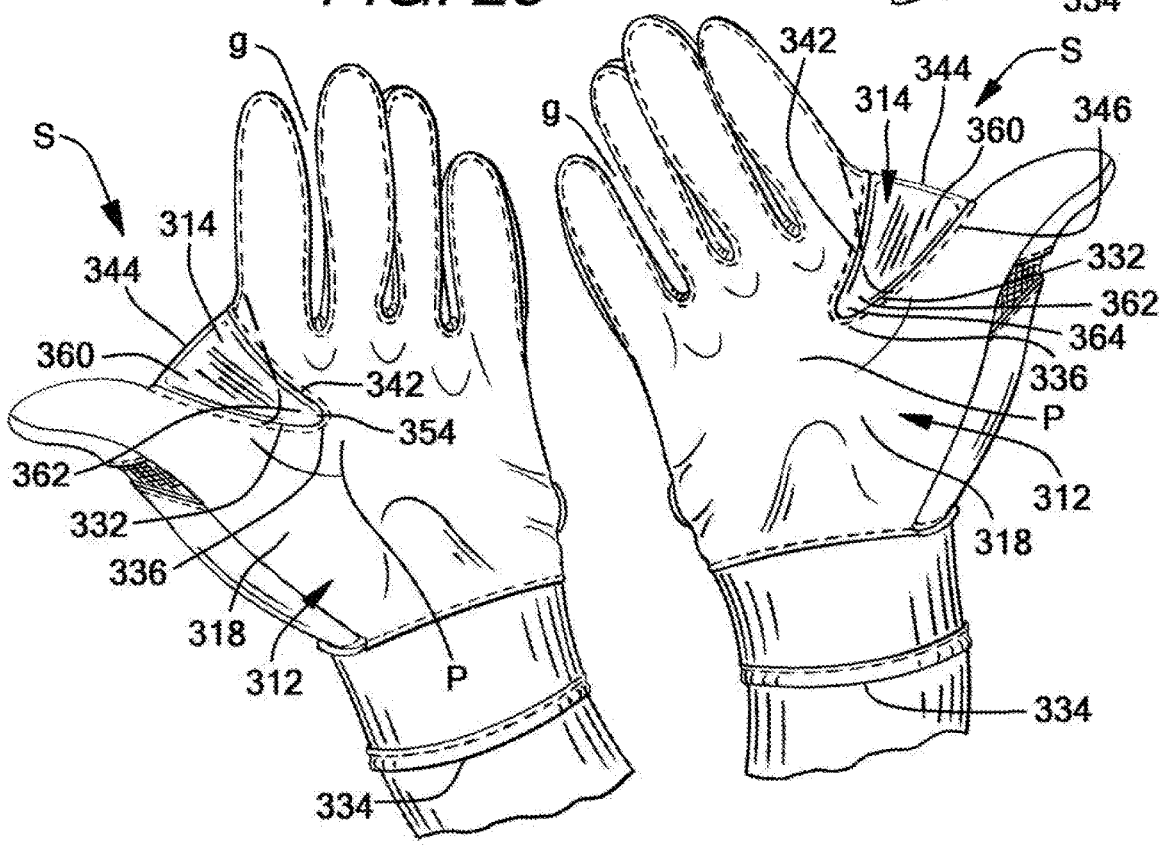
FIG. 25 is an underside perspective view of the pair of batting gloves shown in FIG. 24.

As further shown for example in FIGS. 24-25, the cover member 312 is a typically constructed batting glove. Thus, the cover member 312 has a top portion 316 and a bottom portion 318 that cooperate to define additional parts of the batting glove 310 such as receiving portions or receiving stalls for receiving various portions of the hand. The top portion 316 could be integral with the bottom portion 318. It is understood, however, that in an exemplary embodiment, the top portion 316 may be connected to the bottom portion such as by sewing to define a junction between the portions 316,318. As can be appreciated from the figures herein, in an exemplary embodiment, the cover member 312 is dimensioned to cover or encompass an entire hand of a user. In other exemplary embodiments, at least the bottom portion 318 covers an entire bottom portion of a user's fingers and thumb as well as a palm of the hand.

The cover member 312 defines a plurality a finger elements 320 or finger sections 320 and a thumb element 322 or thumb section 322. In particular, the finger elements 320 include a forefinger element 324, a middle finger element 326 or long finger element 326, a ring finger element 328 and a little finger element 330. The cover member 312 has gaps g generally located between the finger elements 320 and thumb element 322. It is understood that the finger elements 320 and thumb element 322 are constructed for independent movement with respect to the other elements when the glove 310 is worn by a user. As the cover member 312 is designed to cover a user's entire hand, it is further understood that the finger elements 320 and thumb element 322 provide closed distal ends in an exemplary embodiment.

The cover member 312 further has a web space S generally located between the forefinger element 324 and the thumb element 322. The web space S may also be referred to as a thenar space. The forefinger element 324 and thumb element 322 further define a curved segment 332 (FIG. 25-28). In particular, an inner portion of the forefinger element 322 transitions to an inner portion of the thumb element 322 in a curved fashion and forms a generally V-shape as the curved segment 332 extends more in a converging fashion. In an exemplary embodiment, and as explained in greater detail below, the curved segment 332 extends into a palm portion P (FIG. 25) of the bottom portion 318. The curved segment 332 also extends generally from the forefinger element 324 and extending around to the thumb element 322. In this exemplary embodiment, and as explained in greater detail below, the location of the junction of the top portion 316 and the bottom portion 318 can vary or include multiple junctions. As previously discussed, the juncture at some locations between the top portion 316 and the bottom portion 318 may be proximate a midpoint of the heights of the finger elements 320 when a user's hand is inserted into the glove 310. In this particular embodiment, the juncture can be towards or at the bottom portion 318 or palm portion of the bottom member 318 as can be appreciated from FIG. 30. The forefinger element 324 and thumb element 322 cooperatively define heights that generally define a plane P (FIG. 30) wherein the web element 314 is generally positioned proximate a bottom of the plane P as will be described in greater detail below. The top portion 316 is configured to cover a back of the hand and the bottom portion 318 is configured to cover a palm of the hand. As discussed, the top portion 316 is dimensioned to cover an entire back of the hand although it is understood that the top portion 16 may have certain small openings for air flow and comfort. The bottom portion 318 is dimensioned to cover an entire palm portion of the hand in an exemplary embodiment. The cover member 312 further defines a central opening 334 for entry of the user's hand when wearing the batting glove 310 such as shown in FIGS. 24-25.

The top portion 316 and bottom portion 318 of the cover member 12 have confronting segments 336 that cover the thenar region of the wearer's hand. The curved segment 332 may be considered to also extend between the confronting segments 336. In certain previous exemplary embodiments described herein, the confronting segment 336 of the bottom portion 318 is void of additional padding or cushioning and is merely comprised of the material of the cover member 312 at that location (See e.g., FIG. 8). Alternatively, additional cushioning or padding could be used as well as at other areas of the cover member 312 as will be further described below. It is further understood that the cover member 312 can be made from several different materials including leather or synthetic materials. The cover member 312 may be made from Spandex materials, Lycra materials, nylon materials, or other resilient materials, or combinations of such materials. For example, the bottom portion 318 may be made from leather or similar material while the top portion 316 may be made from leather materials in combination with elastic and breathable type materials, wherein such materials can be interspersed between leather segments. It is also understood that the inside of the cover member 312 may employ soft materials such as cotton at selected areas for additional comfort. It is further understood that the cover member 312 could include an elastic band 338 attached proximate the central opening 334. The elastic band 338 includes a fastener mechanism 340 typically in the form of a hook and loop fastener to wrap around a wrist of the user.

Figure 27:
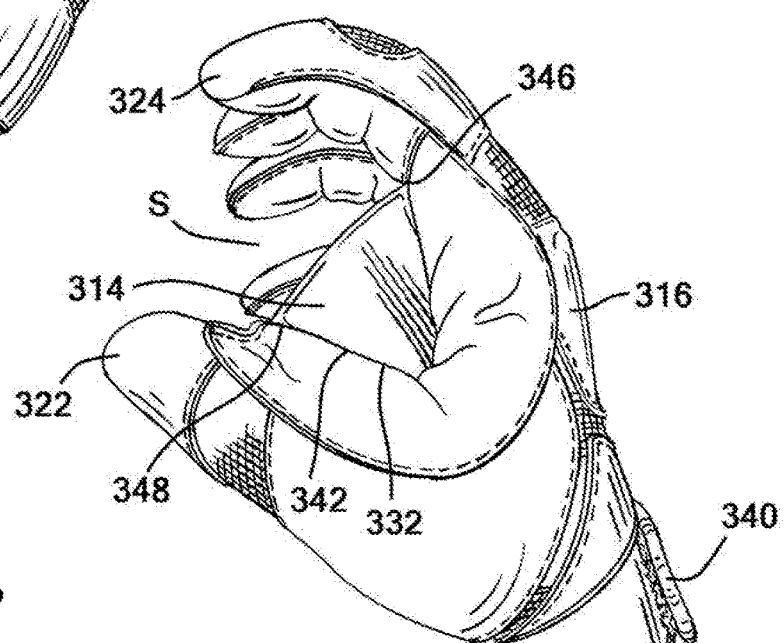
FIG. 27 is another side perspective view of the batting glove shown in FIG. 26.
Figure 28:
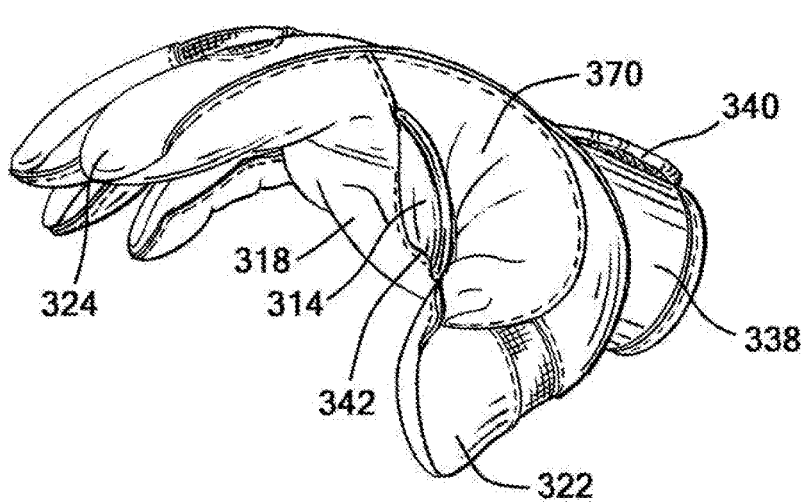
FIG. 28 is another perspective view of the batting glove shown in FIG. 26.
Figure 29:
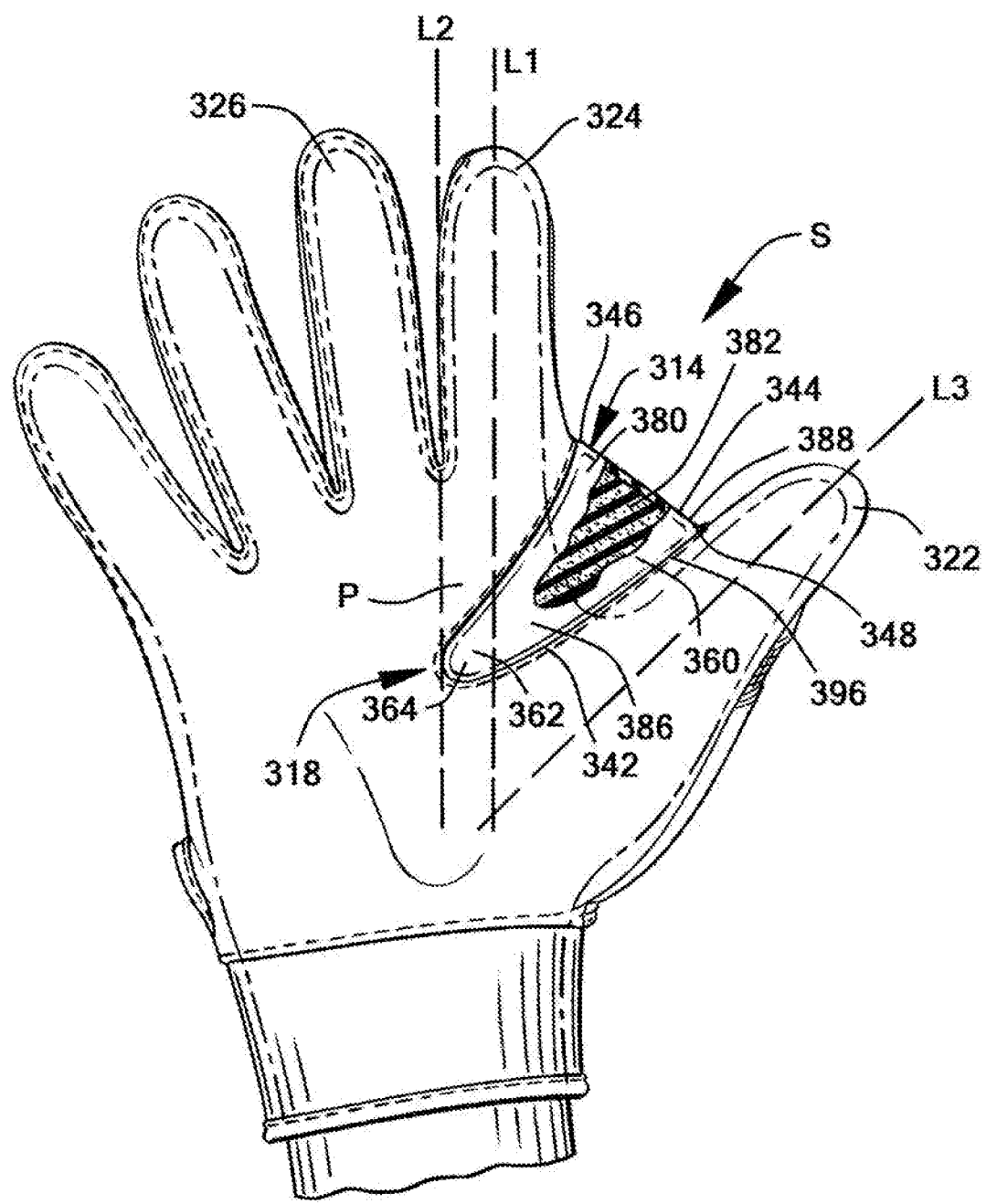
FIG. 29 is a bottom plan view of the batting glove shown in FIG. 26.

As further shown in FIGS. 24-29, the web member 314 is generally a flexible, elastic, resilient or resiliently compressible member in one exemplary embodiment. The web member 314 is generally positioned between the thumb element 322 and the forefinger element 324. In this exemplary embodiment, the web member 314 extends further into an area of the bottom portion 318 that covers the palm and including the thenar region of the hand when the glove 310 is worn by a user. The web member 314 has a web space portion 360 extending into the thenar space and an extension portion 362 extending into the bottom portion 318 of the cover member 312 as will be described in greater detail below. The web member 314 thus occupies at least a portion of the web space S. In an exemplary embodiment, web space portion 360 of the web member 314 extends away from the curved segment 332 of the cover member 312 and extends substantially into the web space S. In an exemplary embodiment, the extension portion 362 is adjacent to and is integral with the web space portion 360. The extension portion 362 defines a base portion 364 that is proximate to the bottom portion 318 of the cover member 312 of the glove 310. The extension portion 362 extends into the bottom portion 318 of the cover member 312. The extension portion 362 is positioned to cover a portion of a palm of a hand of the user wearing the glove 310 as will be explained in greater detail below. The web space portion 360 further defines a distal, outer peripheral segment 344 of the web member 314 opposite the base portion 364 of the extension portion 362 and is generally a linear segment. The extension portion 362 and web space member 360 of the web member 314 cooperate to define a curved portion 342 that extends from one end of the outer peripheral segment 344, around the base portion 364 and to the other end of the outer peripheral segment 344. The curved portion 342 generally corresponds to the curved segment 332 defined by the outer portion of the forefinger element 324 and the thumb element 322, and in this exemplary embodiment, the curved portion 342 is a substantially V-shaped segment as shown in FIGS. 25 and 29.

Figure 33:
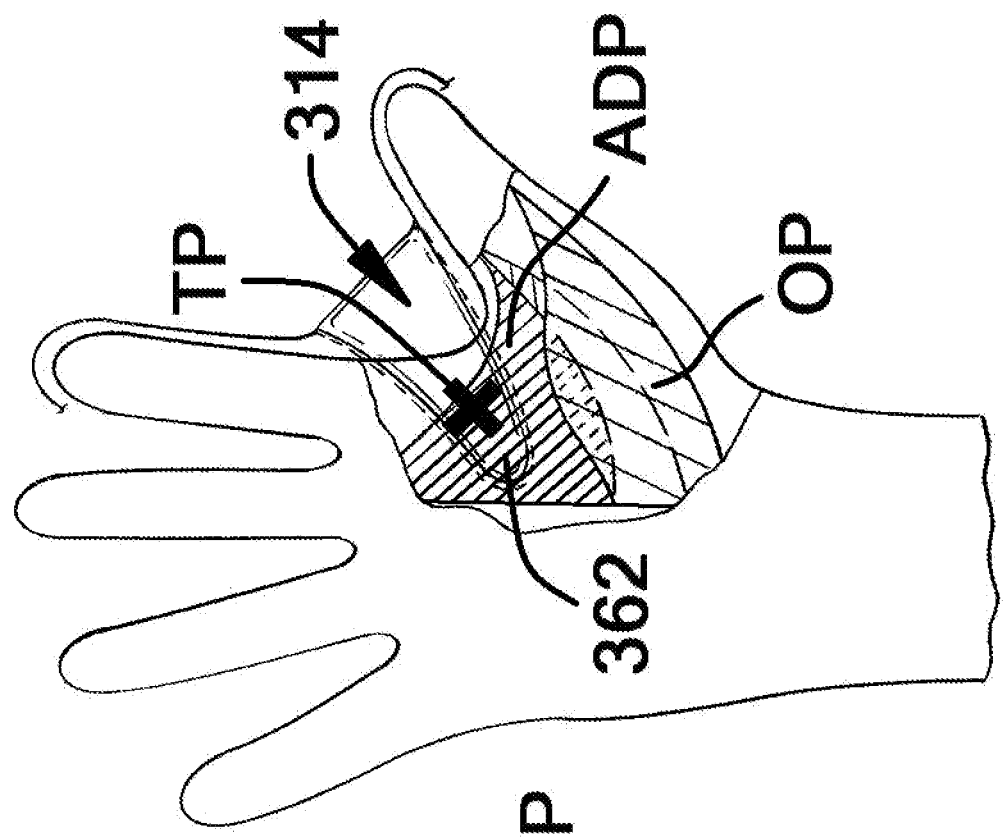
FIG. 33 is a schematic plan view of a human right hand with portions removed to show certain muscles in the hand.
Figure 34:
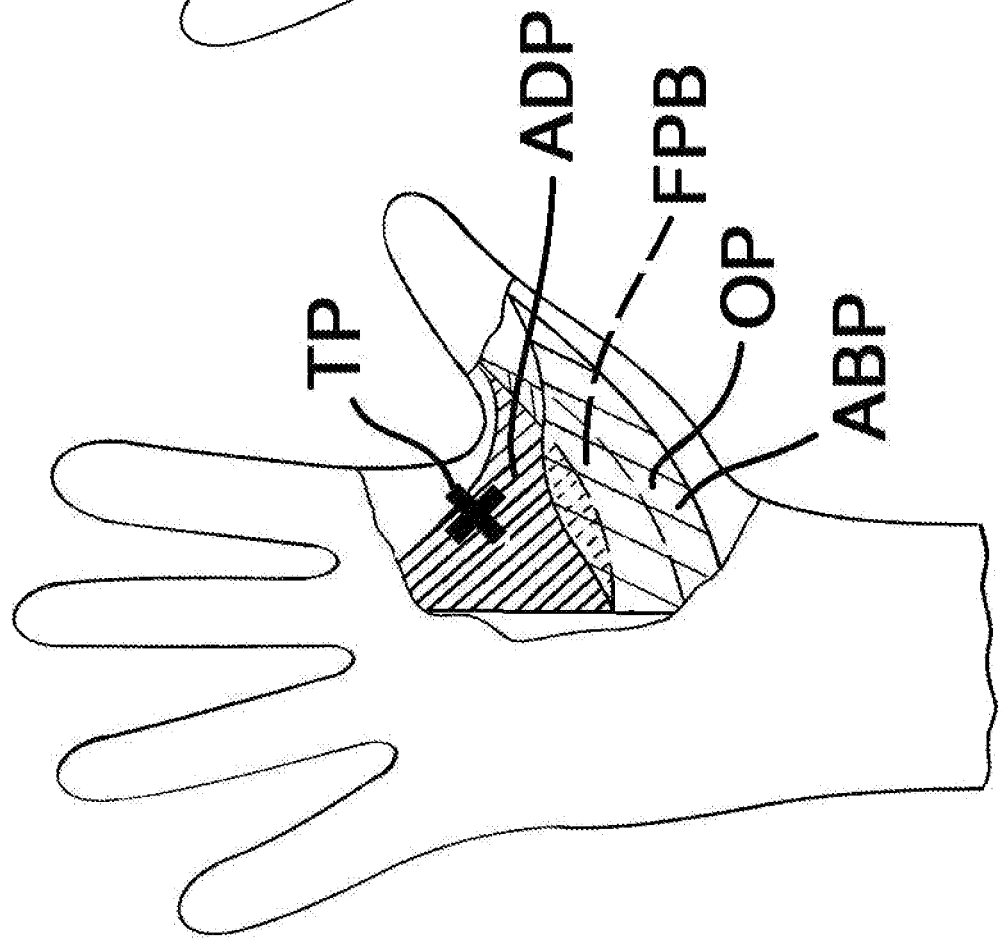
FIG. 34 is a schematic plan view of FIG. 33 with a portion of the batting glove of FIG. 24 shown schematically over the hand.
Figure 33B:
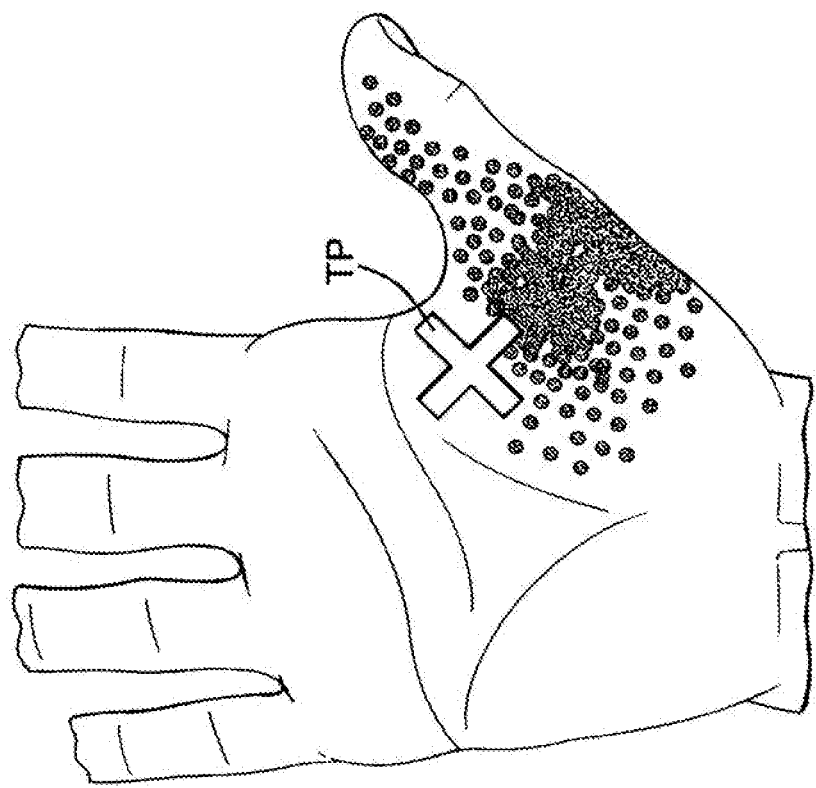
FIG. 33B is a schematic plan view of a human right hand and showing a trigger point and a schematic pain distribution associated with the trigger point.

As further shown in FIGS. 25 and 29, the extension portion 362 extends into the palm portion of the bottom portion 318, and further extends at an angle. As shown in FIG. 29, it is shown that the forefinger element 324 defines a first longitudinal axis L1 that extends through a central portion of the forefinger element 324 and further into the palm portion of the bottom member 318. The extension portion 362 of the web member 314 extends past the first longitudinal axis L1. The forefinger element 324 further defines a second longitudinal axis L2 through an end of the forefinger element 324 adjacent the middle finger element 326 and further extends into the palm portion of the bottom member 318. The extension portion 362 of the web member 314 extends proximate to the second longitudinal axis L2. As further shown in FIGS. 25 and 29, the thumb element 322 defines a thumb longitudinal axis L3 that extends through a central portion of the thumb element 322. The extension portion 362 extends into the bottom portion 318 in a direction generally parallel to the thumb longitudinal axis L3 of the thumb element 322. The extent of the positioning of the extension portion 362 into the palm portion of bottom member 318 generally corresponds to the web member 314 including the extension portion 362 covering proximately the thenar region of a user's hand when wearing the glove 310 and, in particular, generally covering a portion of or placed proximately over the thenar region, or thenar eminence of the user's hand and in particular, a portion of the adductor pollicis muscle of the user's hand. This provides additional comfort to the thenar region of the hand when a user wears the batting glove 310 for hitting a ball. As further can be appreciated from FIG. 29, the areas of the bottom portion 318 extending away from and around the web member 314 and extension portion 362 are plain and uninterrupted in an exemplary embodiment, FIG. 33 shows a user's hand and schematically, with a portion of skin layers removed to expose certain muscles in the thenar region, or thenar eminence of the user's hand. As discussed above, one muscle is the adductor pollicis muscle ADP (including oblique and transverse components) and another thenar group of muscles including three muscles: the abductor pollicis ABP, the opponens pollicis muscle OP and the flexor pollicis brevis FPB. There are additional muscles in the hand and the inventors recognize further that the muscles have layers and may sometimes be referenced with different nomenclature. The adductor pollicis muscle ADP and oppenens pollicis muscle OP are important in gripping configurations of the hand such as in gripping a baseball bat. As further shown in FIG. 33A, an ulnar nerve UN of the body has a branch having a distal end that is positioned proximate the adductor pollicis muscle AP. The ulnar nerve UN has a further branch, which may be referred to as a median nerve MN as described below. Based on research of medical professionals, the adductor pollicis muscle AP has a trigger point TP associated therewith as shown in FIG. 33 and FIG. 33B. When the adductor pollicis muscle is subjected to certain stressors, the trigger point TP can turn "ON" (or activated) wherein pain, soreness and discomfort is experienced in the adductor pollicis ADP muscle and can further be experienced in other portions in the thenar region of the hand as described herein. FIG. 33B shows schematically, via the stippling markings, the pain distribution associated with the trigger point TP of the adductor pollicis muscle AP. It is further understood that the pain distribution can extend further to the dorsal side of the thumb. FIG. 34 shows the user's hand with a portion of the glove 310 schematically wherein the extension portion 362 of the web member 314 is positioned generally over the trigger point TP area of the adductor pollicis muscle ADP when the glove 310 is worn by the user on the hand. These structures and configurations will be described in further detail below.

Figure 33A:
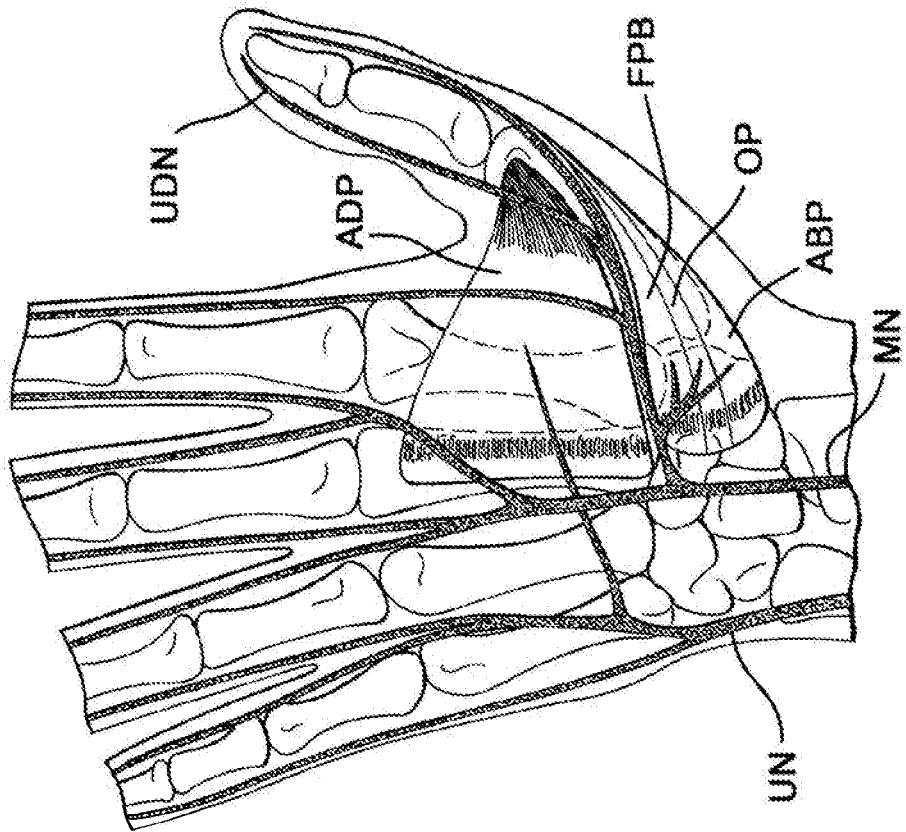
FIG. 33A is a schematic plan view of a human right hand with portions removed to show certain muscles and nerves in the hand.

FIG. 33A further shows additional segments of the ulnar nerve UN in the hand. As shown, the ulnar nerve UN has branches that extend to sides of the fingers and may be referred to as ulnar digital nerves and radial digital nerves. The ulnar nerve UN further includes a median nerve segment MN that has branches to the different fingers and further includes an ulnar digital nerve to the thumb UDN. The median nerve MN has an additional branch proximate the thenar muscles as described above, namely the abductor pollicis muscle ABP, the opponens pollicis OP and the flexor pollicis brevis FPB muscle. The web member 314 including the extension portion 362 provides protection including to the ulnar digital nerve UDN to the thumb. With protection to this branch UDN of the ulnar nerve, the thenar muscles are protected to provide comfort thereto and including the flexor pollicis brevis FPB muscle.

Figure 26:
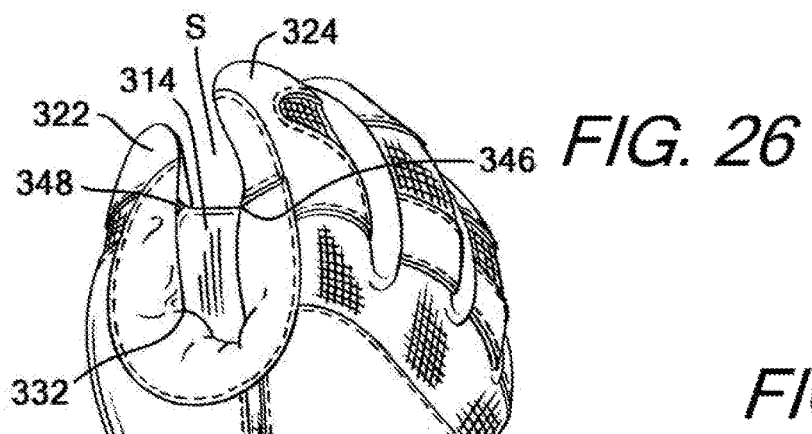
FIG. 26 is a perspective view of a right hand batting glove from the pair of batting gloves in FIG. 24.

As shown in FIGS. 26-28, the web member 314 has a first end 346, or first portion 346, contacting the forefinger element 324 and a second end 348, or second portion 348, contacting the thumb element 322. These contact points are proximate a midpoint of the thumb element 322 and proximate a base of the forefinger element 324 in an exemplary embodiment. The web member 314 can vary in size wherein these contact points could extend to various points on the thumb element 322 and forefinger element 324. Generally, however, the web element 314 has the first portion 346 connected to the forefinger element 324 and a second portion 348 connected to the thumb element 322. As further shown in FIGS. 26-28, the first portion 346 is connected proximate a base of the forefinger element 324, and the second portion 348 is connected proximate a midpoint of the thumb element 322. Such connection points indicate that the web element 314 is a smaller member dimensioned to be in surface-to-surface contact with a bat handle in non-overlapping fashion and not large enough to function as a pocket member for catching a ball such as in a baseball fielder's glove.

The curved portion 342 of the web member 314 is operably connected to the cover member 312 generally at the curved segment 332 of the cover member 314. As explained in greater detail below, the operable connection provides for the extension portion 362 to be in the palm portion of the bottom member 318. The operable connection can take many different forms including sewing, adhesives, heat bonding, welding or other types of fastening methods. In this exemplary embodiment, the curved portion 342 cooperates with additional structures associated with the top portion 316 to be further described below. Generally, the curved portion 342 of the web member 314 is operably connected to the bottom portion 318 and top portion 316 of the cover member 312. As discussed, the web member 314 extends into the web space S between the forefinger element 324 and the thumb element 322. As can be appreciated from FIGS. 27 and 30, the web member 314 is dimensioned such that the web member 314 is in a generally planar or slightly curved relaxed state when the forefinger element 324 and thumb element 322 are at a typical distance apart represented such as when a hand is at a comfortable rested position. Accordingly, as shown in FIGS. 25 and 29, the web member 314 has a generally V-shape extending between the forefinger element 324 and the thumb element 322. The base portion 364 of the web member 314 extends into the bottom portion 318 of the cover member 312 and the web space portion 360 including the distal outer peripheral segment 344 is opposite and remote from the base portion 364. It is further understood that in another exemplary embodiment, the web element 314 can have one portion connected to the thumb element 322 and another portion connected to a finger element 320 that could include other finger elements such as the middle finger element 326, the ring finger element 328 or the little finger element 320. In addition to providing cushioning against the thenar region of the wearer's hand, such construction can minimize the sting sometimes experienced in the fingers such as when hitting a ball at an end of the baseball bat (FIGS. 2 and 12).

As discussed, the size of the web member 314 can vary wherein the farther along the web member 314 is connected to the forefinger element 324 and the thumb element 322 the larger the size of the web space portion 360 and the overall web member 14. The extension portion 362 of the web member 314 further affects the overall size of the web member 314. In certain exemplary embodiments, the distance from an apex area or an apex of the base portion 364 to the outer peripheral segment 344 could be approximately 1.75 inches or 2 inches. In a further exemplary embodiment, the distance may be 1⅛ inches. Other exemplary embodiments can have a distance from approximately ¼ inch to 2-3 inches. The web member 314 extends substantially into the web space S between the forefinger element 324 and the thumb element 322. In additional exemplary embodiments, a central portion of the web member 314 may extend from approximately ¼ inch to approximately 1 inch, while outer portions of the web member 314 towards the outer peripheral segment extend respectively further up on the forefinger element 324 and the thumb element 322. In such configuration, the web member 314 has a more pronounced, deeper and more narrow V-shape or parabolic shape.

Figure 30:
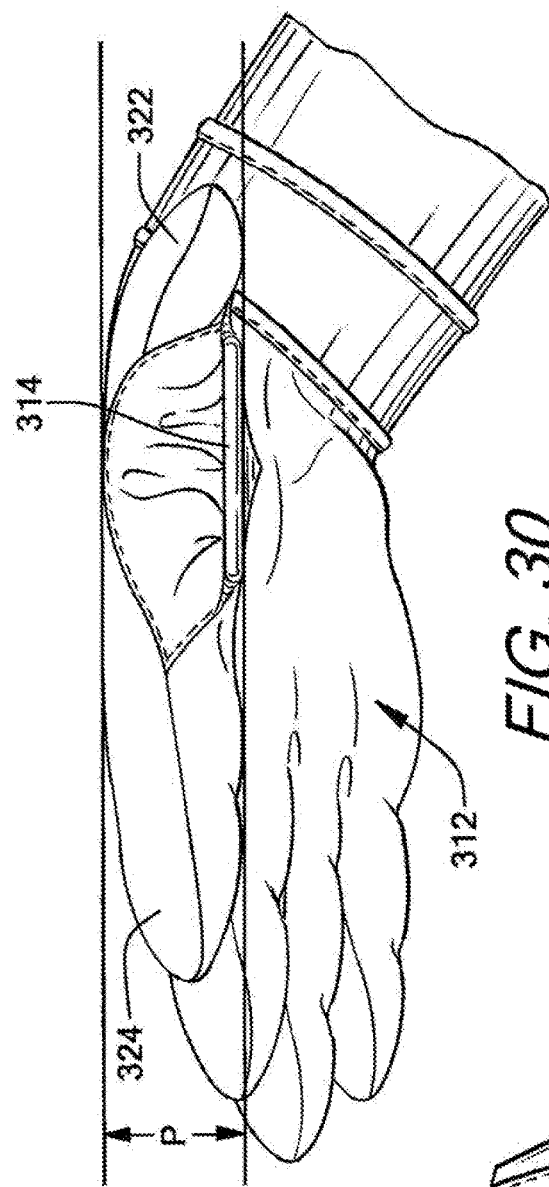
FIG. 30 is an end elevation view of the batting glove shown in FIG. 26 and showing a web member positioned between a forefinger element and a thumb element and proximate a bottom of a plane defined by the elements.

As discussed, the web member 314 extends into the web space S between the forefinger element 324 and the thumb element 322. As shown in FIG. 30, the forefinger element 324 and thumb element 322 define the plane P wherein the web element 314 is generally positioned proximate a bottom of the plane P. The plane P could also be considered to correspond to the respective heights of the forefinger element 324 and thumb element 322 and wherein the web member 314 resides proximate a bottom of the heights of the elements 322,324. The web member 314 further occupies the web space S at the bottom of the plane P. Thus, the unique connection of the web element 314 to the cover member 312 (e.g., the connection of the curved portion 342 to the curved segment 332 generally at the juncture of the portions 316,318 at these locations) provides for the extension of the web element 314 from the cover member 312 and positions the web element 314 proximate a bottom of the plane P and in the web space S. The structure and configuration of the web member 314 and its operable connection to the cover member 312 provides benefits to the wearer regarding protection and comfort to the thenar region of the hand as described in greater detail below.

FIGS. 24-31 show additional features of the web member 314 of the glove 310. In this exemplary embodiment and shown in particular in FIGS. 29 and 31, the web member 314 is multi-layered and has an outer layer 380 and an inner layer 382. As explained in greater detail below, the outer layer 380 fully encompasses the inner layer 382 within the outer layer 380. This configuration and materials associated with the web member 314 provide enhanced functionality as described below. It is understood that the web member 314 utilizing the layers 380,382 also includes the layers 380,382 cooperatively forming the web space element 360 and the extension portion 362 positioned into the palm portion of the bottom portion 318 of the cover member 312 as described.

Figure 31:
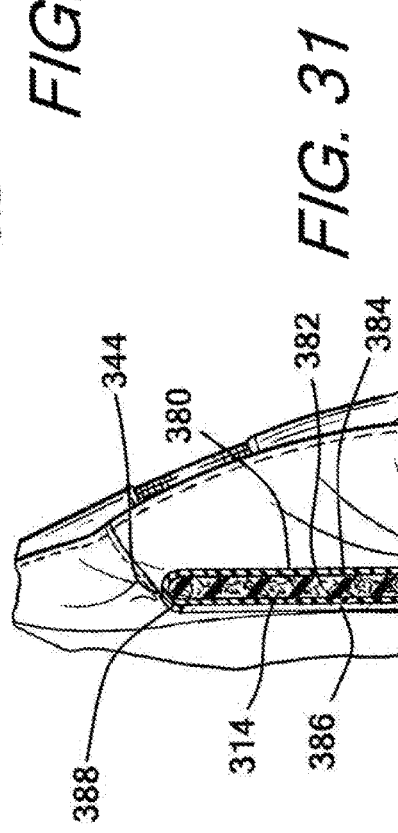
FIG. 31 is a partial side elevation view of the batting glove of FIG. 26 and showing the web member in cross-section.

The outer layer 380 is further shown in FIGS. 29 and 31. As discussed above, the outer layer 380 has a shape corresponding to the web member 314 and defines the web space portion 360, the extension portion 362, the outer peripheral segment 344 as well as the first portion 346 and the second portion 348. The outer layer 380 further has a top portion 384 and a bottom portion 386. As will be described in greater detail below, the top portion 384 of the outer layer 380 is operably connected to the top portion 316 of the cover member 312. The bottom portion 386 of the outer layer 380 is operably connected to the bottom portion 318 of the cover member 312. The outer layer 380 further has an interface portion 388 between the top portion 384 of the outer layer 380 and the bottom portion 386 of the outer layer 380 positioned at and defining the outer peripheral segment 344. In an exemplary embodiment, the top portion 384, bottom portion 386 and interface portion 388 define an integral member, although the respective portions can define separate members in other embodiments. The web member 314 thus folds upon itself generally at the interface portion 388 wherein the top portion 384 is positioned generally adjacent the bottom portion 386 with the inner layer 382 therebetween.

It is understood that the outer layer 380 can be made from different materials as further described herein. In one exemplary embodiment, the outer layer 380 is made from the same material as the bottom portion 318 of the cover member 312. In such an exemplary embodiment, the material utilized is a leather material. The outer layer 380 could be made from other materials including synthetic materials having high tensile strength or other similar materials, FIGS. 29 and 31 also show the inner layer 382 of the web member 314. For clarity, it is understood in FIG. 29 that a portion of the outer layer 380 is schematically removed to expose the inner layer 382. The inner layer 382 is dimensioned to be received by the outer layer 380. In this exemplary embodiment, the inner layer 382 has a shape that generally corresponds to the shape of the outer layer 382 and sized to fit circumjacently within the outer layer 382. Thus, peripheral edges of the inner layer 382 are positioned generally within respective peripheral edges of the outer layer 380. As discussed, it is understood that the inner layer 382 further cooperates with the outer layer 380 to define the web space portion 360 and the extension portion 362.

In this embodiment, the inner layer 382 is made from a resiliently compressible material and considered a smart or intelligent material. The resiliently compressible material has shock absorbing properties that assist in cushioning muscles in the batting glove wearer's hand and, in particular, in the thenar region of the hand. The compressible material of the inner layer 382 may be a polyurethane energy-absorbing material containing certain additives and a dilatant non-Newtonian fluid such as polyborodimethylsiloxane (PDBMS). In this particular embodiment, the material is a closed cell polyurethane foam composite with PDBMS as the dilatant dispersed through the foam matrix and further includes a fluid also dispersed therein. The material is further described in U.S. Pat. No. 7,381,460 which is incorporated herein by reference. The material is an energy absorbing composite material having a solid foamed synthetic polymer matrix, and a polymer-based dilatant that is distributed through the polymer of the matrix and incorporated into the polymer of the matrix during formation of the polymer matrix, and a fluid distributed through the matrix. The combination of the matrix, dilatant and fluid provides a composite material that is flexible and resiliently compressible.

The inner layer 382 formed from the polyurethane energy-absorbing material with the PDBMS dispersed therein provides unique and enhance functionality for the batting glove 310. The molecules of such material flow past each other at low rates of movement wherein the material possesses suitable flexibility. On experiencing a shock or impact, the molecules move quickly and instantaneously lock together by linking together with each other to form a protective barrier. This state of the material provides comfort to the thenar region of the hand, and in particular the adductor pollicis muscle, as described in greater detail below. After the shock or impact, the material returns to its original state and flexibility. Thus, such material provides an enhanced construction to assist in minimizing activation of the trigger point of the muscles in the thenar region of the hand.

The inner layer 382 could also be formed from other resiliently compressible materials. For example, the inner layer 382 may be in the form of impact absorbing foam, or anti-shock slow recovery foam. Such material includes a foam base material that may be referred to as a matrix. Such material further includes a polymer material having molecules wherein the polymer material has dilatant properties wherein the material is operably associated with the foam base material wherein the molecules move freely within the base material wherein the material is in a soft and flexible state in a first state. The dilatant properties of the polymer material provides for an increase in viscosity and setting as more of a solid as a result of deformation by expansion, pressure or agitation including an impact or shock. Upon experiencing an impact, the molecules lock to define a second state to absorb and dissipate the impact. After the impact, the molecules again move freely with the foam base in the first state wherein the material again becomes soft and flexible. Thus, the material may be described as an impact absorbing foam material that is resiliently compressible. When incorporated as the inner layer of the web member 314 or made as the web member 314 material itself, the material absorbs and dissipates impact such as in response to an athlete hitting a pitched ball with a bat while wearing the athletic gloves when swinging the bat as described herein. It is further understood that the inner layer 382 can be in the form of a foam-based material having an air-cell structure that provides vibration dampening properties.

The inner layer 382 could also be formed from other materials. For example, the material could also be formed from other intelligent, shock-absorbing materials. The intelligent shock absorbing material detects a change in strain in response, for example, from an impact (e.g., a user wearing the glove swinging a bat and hitting a ball), which causes the material to change its state from flexible to rigid, wherein the material absorbs the energy of the impact. The inner layer 382 can also be formed from a synthetic viscoelastic urethane polymer. This material serves as a shock absorber and vibration dampener. Thus, when incorporated into the web member 314, the layer 382 provides benefits to the thenar region of a user's hand as described herein.

It is understood that the web member 314 could be constructed from the material of the inner layer 382 described above including the resiliently compressible material or other intelligent shock-absorbing materials. Thus, the web member 314 could be a single layer of such material wherein the outer layer 380 is not utilized. In one exemplary embodiment, however, the outer layer 380 encases or encompasses the inner layer 382 of such materials. The outer layer 380 is in confronting relation to the inner layer 382 and in an exemplary embodiment, the outer layer 380 and inner layer 382 are in surface-to-surface engagement with one another as shown for example in FIG. 31.

As discussed, in exemplary embodiments, the web member 314 is multi-layered. The web member may have an inner layer enclosed in an outer layer as discussed. In further embodiments, the web member 314 may have three layers that are each made of a different material. The web member 314 can further have two layers or more than three layers.

Figure 29A:
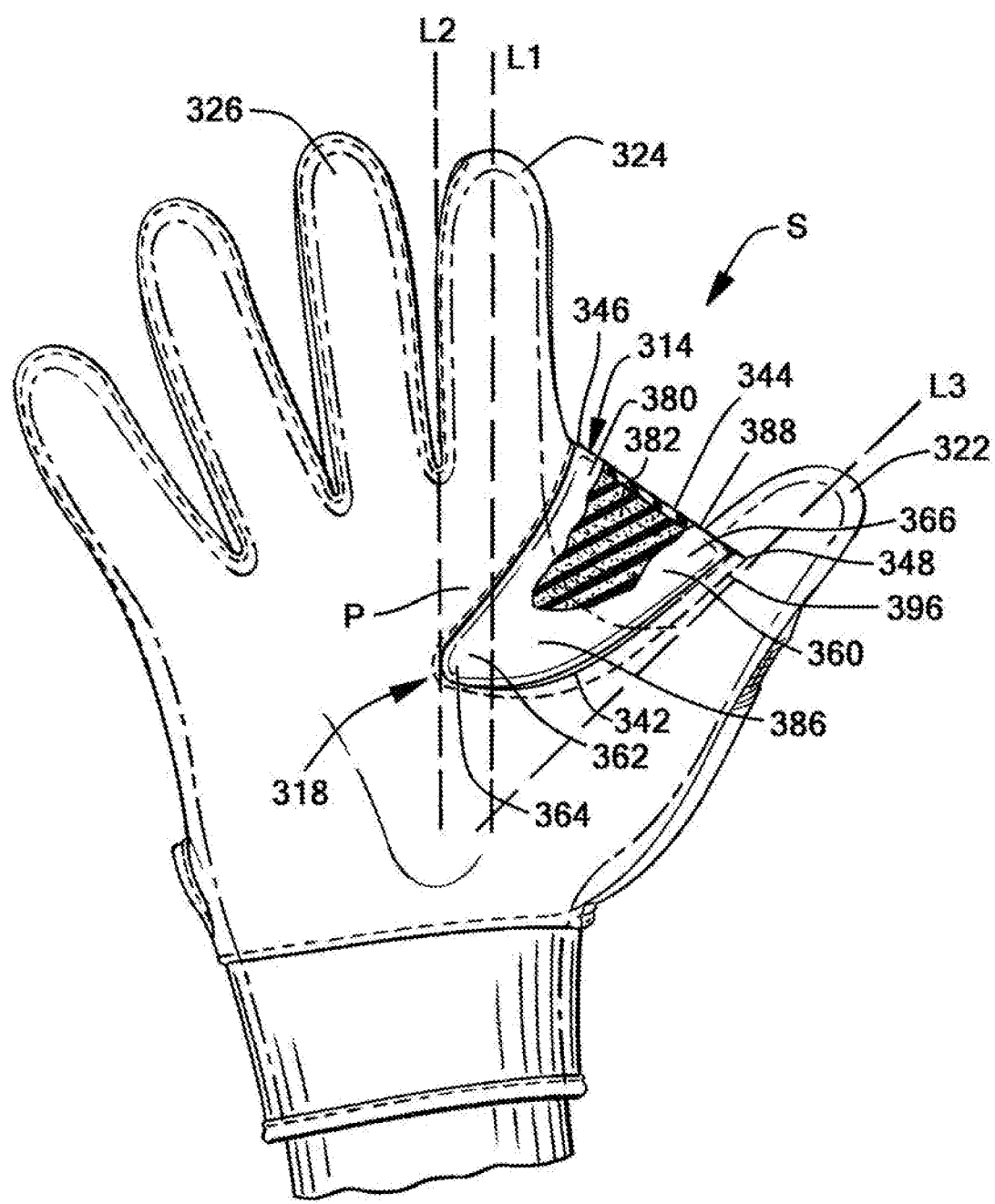
FIG. 29A is a bottom plan view of an alternative embodiment of the batting glove shown in FIG. 26

FIG. 29A shows a further alternative embodiment of the web member 314. It is understood that the web member 314 can have the structural characteristics as previously described including the multi-layered constructions of the outer layer 380 and the inner layer 382. In this embodiment, the web member 314 has a thumb pad segment 366 that extends further into a thumb portion of the bottom portion 318 of the glove 310. The thumb pad segment 366 extends into the bottom portion 318 wherein the thumb pad segment 366 covers at least a portion of the thumb pad of the user when the user wears the glove 310. With this extended configuration, further protection is provided to the ulnar digital nerve to the thumb UDN. With protection this branch UDN of the ulnar nerve UN, further protection and enhanced comfort is also provided to the thenar muscles including the flexor pollicis brevis muscle FPB. It is understood that the web member 314 can be further extended into the thumb portion as schematically represented by the dashed line segments in FIG. 29A.

Figure 39:
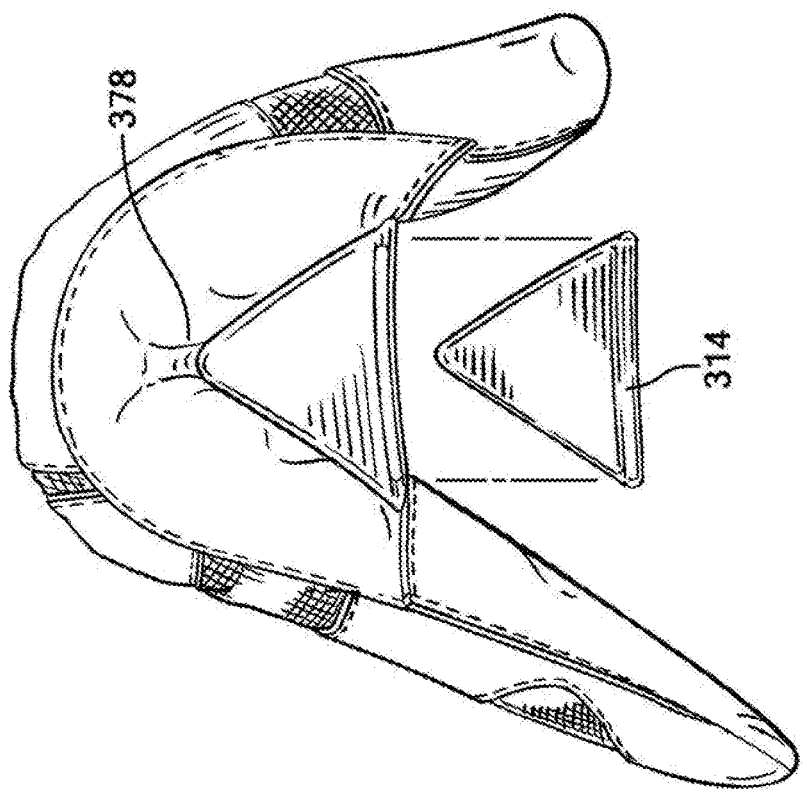
FIG. 39 is a partial top perspective view of the batting glove shown in FIG. 38 and showing the web member portion in exploded view.

As discussed, the web member 314 is operably connected to the cover member 312. As will be described in greater detail, peripheral edges of the web member 314 are connected to the bottom portion 318 of the cover member 312. The top portion 316 has additional structural features to cooperate with the web member 314 to enhance the functionality and comfort of the glove 312. FIGS. 38-41 show a structural curved portion associated with the top portion 316 and web member 314. The curved portion defines a curved wall 370 is positioned generally around the web member 314. The curved wall 370 extends around the extension portion 362 and the web space portion 360 while the outer peripheral segment 344 remains open to the web space S. In particular, the curved wall has a curved wall first end 372 at the first portion 346 of the web member 314, a curved wall central portion 374 at the base portion 364 of the web member 314 and a curved wall second end 376 at the second portion 348 of the web member 314. As further shown, the curved wall 370 has a height dimension "h". The curved wall 370 has a greater height dimension at the central portion 374 proximate the base portion 364 of the web member 314 than a height dimension at the first portion 346 proximate the curved wall first end 372 or the second portion 348 proximate the curved wall second end 376. Thus, the curved wall 370 has a maximum height dimension proximate the base portion 364 of the web member 314 wherein the height dimension of the curved wall 370 tapers down towards the first portion 346 and the second portion 348. The top portion 384 of the web member 314 and the curved wall 370 cooperatively define a recessed compartment 378 proximate the top portion 316. As will be further described below, the lower portion of the curved wall 370 is connected to and around the web member 314 and an upper portion of the curved wall 370 is further connected to other segments of the top portion 316. The recessed compartment 378 is further shown in FIG. 39. It is noted from FIG. 39 that the web member 314 is connected as described above. As shown in FIG. 39, the web member 314 can also take the form of an insert that can be removably attached to the cover member 312. The attachment can result from a cooperative structure such as a slot that the web member 314 is received by or other mechanisms such as hook and loop fasteners.

Figure 40:
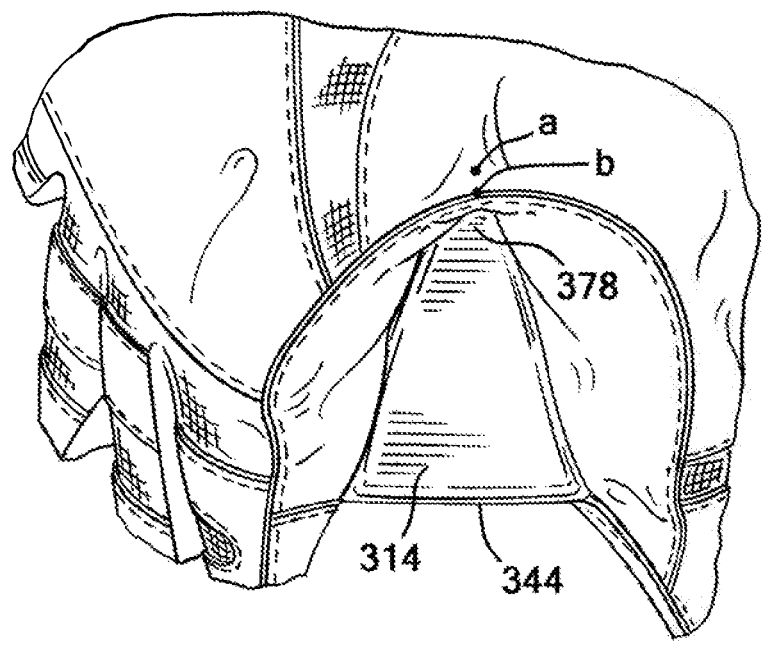
FIG. 40 is a partial top perspective view of the glove and showing a recessed compartment and offset connections associated with the web member and cover member.
Figure 41:
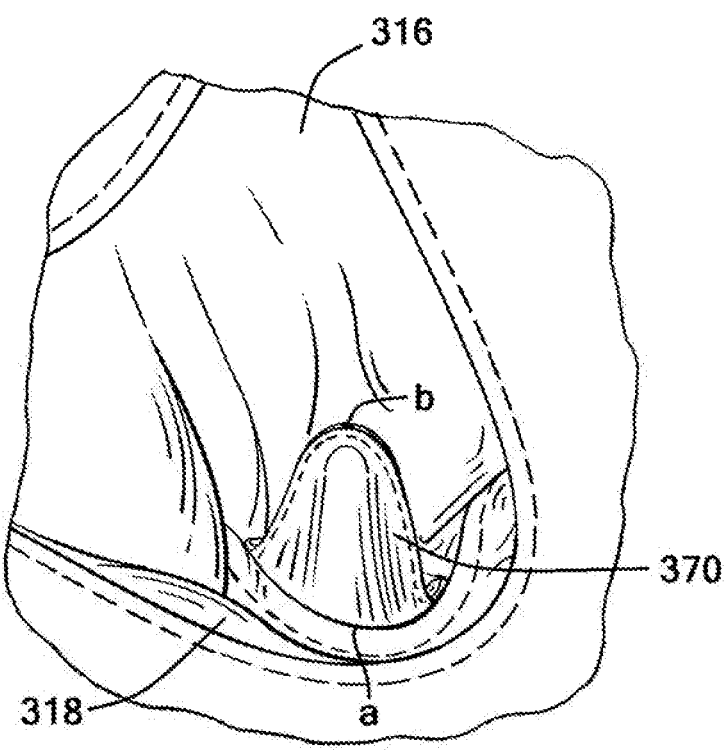
FIG. 41 is a perspective view of an inside of the glove and showing the offset connections associated with web member and the cover member.
Figure 42:
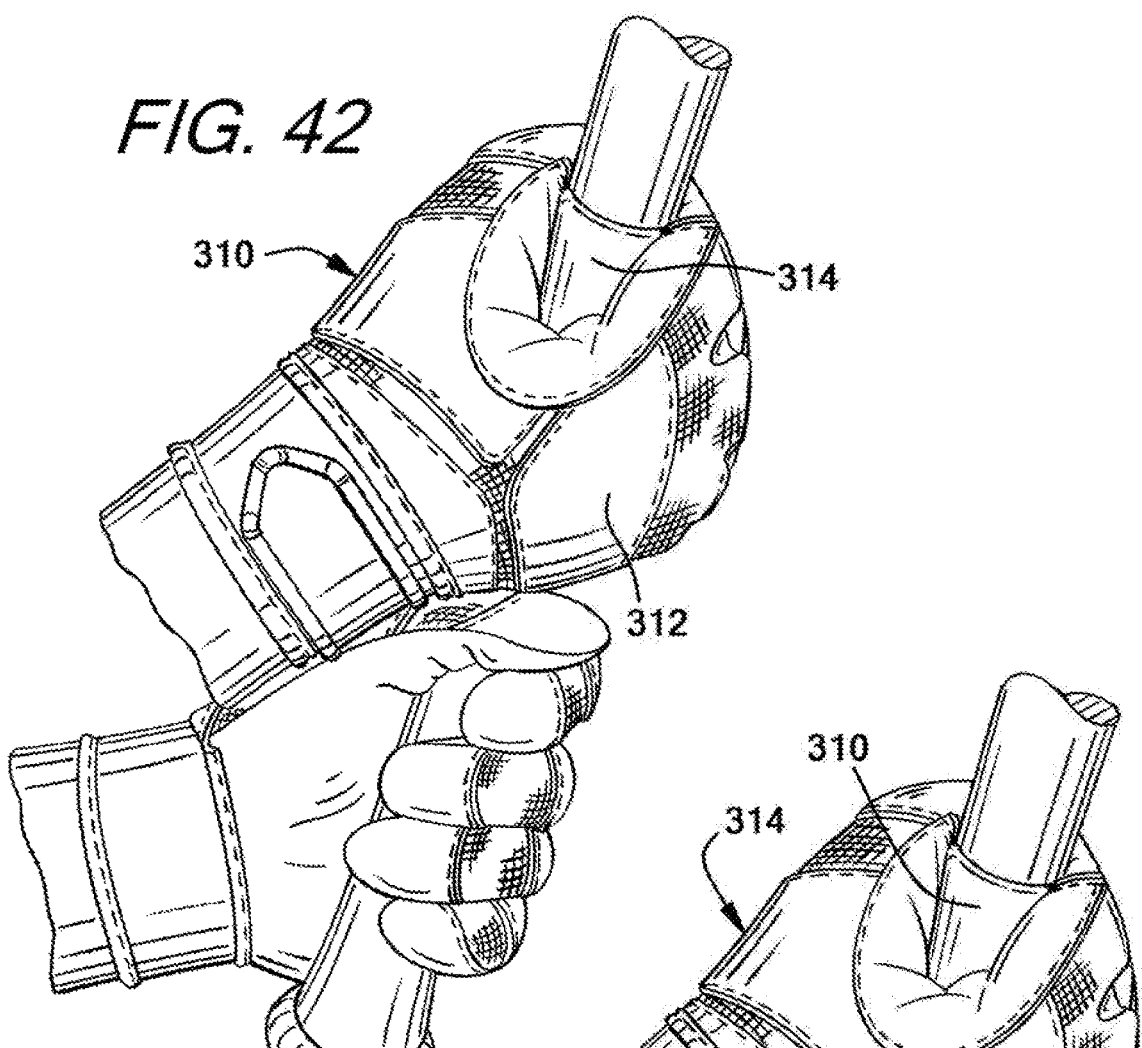
FIG. 42 is a perspective view of a wearer/user of the batting gloves of FIG. 24 and gripping a bat.
Figure 43:
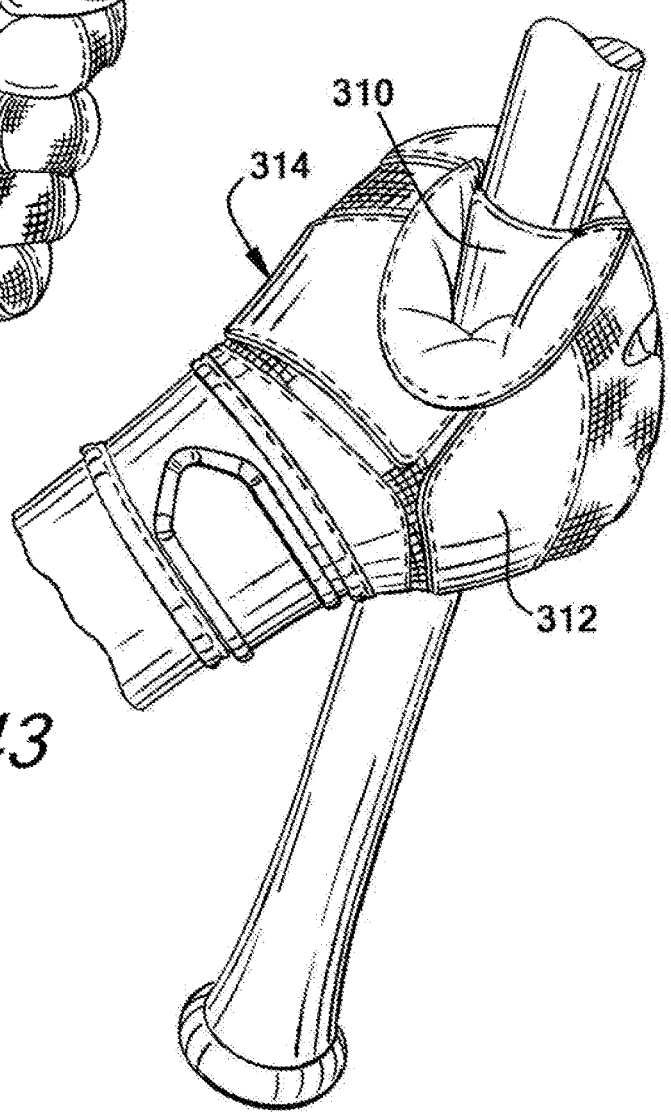
FIG. 43 is a perspective view of the wearer/user of the right hand glove and gripping the bat.
Figure 44:
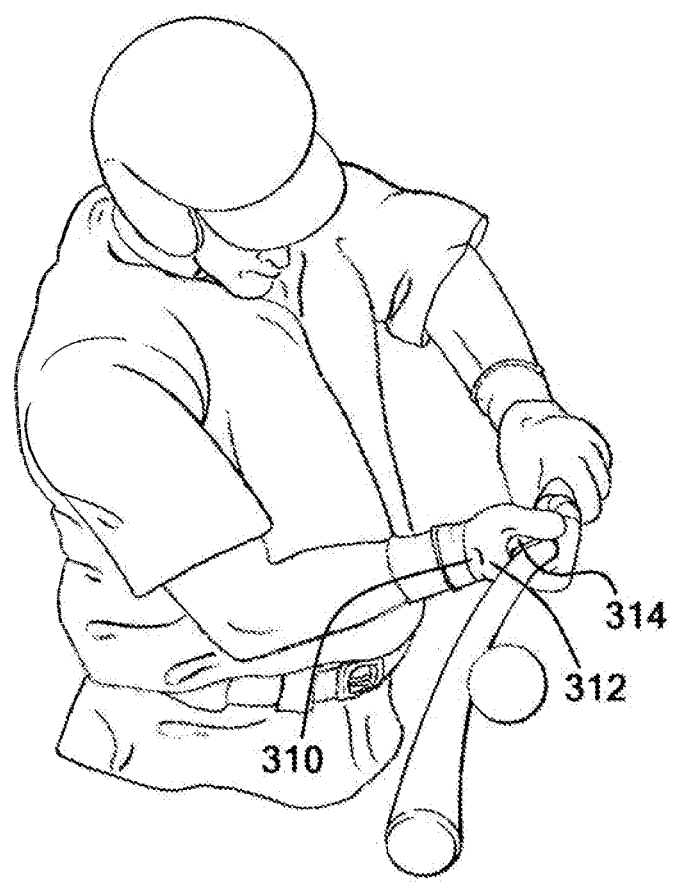
FIG. 44 is a partial perspective of the wearer/user wearing the batting gloves of FIG. 25 and hitting a ball.

FIGS. 29, 31 and 35-41 show further the operable connection between the web member 314 and the bottom portion 318 and top portion 316 of the cover member 312. As shown in FIGS. 29, 31 and 35-37, the web member 314 is connected to the bottom portion 318 of the cover member 312 by a connection member 396. In an exemplary embodiment, the connection member 396 is a thread member and is used in a sewing operation wherein the web member 314 is stitched into the cover member 312. Thus, the thread member 396 extends through the top portion 316 (via the lower portion of the curved wall 370), the top portion 384 of the outer layer 380, the bottom portion 386 of the outer layer 380 and the bottom portion 318 of the cover member 312. The inner layer 382 of the web member 314 is positioned within the connection member 396. Thus, in this exemplary embodiment, the thread member 396 does not pass through the inner layer 382. As further shown in FIGS. 35-39, the upper portion of the curved wall 370 is connected to the top portion 316 of the cover member 312. As further shown in FIG. 40-41, the connection of the web member 314 to the bottom portion 318 of the cover member 312 at the extension portion 362 is offset from the connection of the curved wall central portion 374 to the top portion 316 of the cover member 312. Thus, as shown in FIGS. 40-42, the connection of the base portion 364 of the web member 314, bottom portion 318 and bottom portion of the curved wall 370 (at location "a") is further into the palm portion of the bottom member 318. The connection of the upper portion of the curved wall 370 to the top portion 316 (at location "b") is offset and more towards the outer peripheral segment 344 of the web member 314. This structural configuration provides for the extension portion 362 being positioned in the palm portion of the bottom portion 318 of the cover member 312 while allowing the web member 314 to wrap around a bat while having enhanced comfort for the wearer/user (See e.g., FIGS. 42-43).

Figure 35:
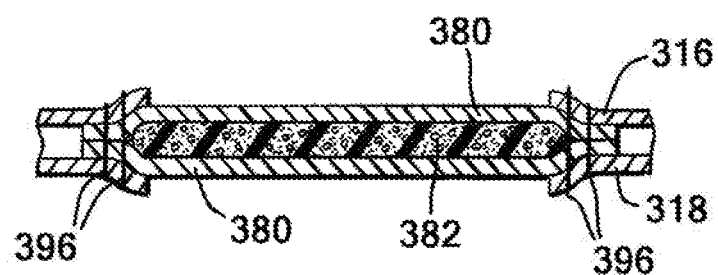
FIG. 35 is a schematic cross-sectional view of a web member attached to a cover member of the batting glove of FIG. 24.
Figure 36:
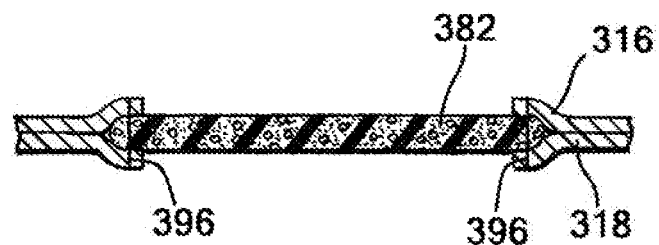
FIG. 36 is a schematic cross-sectional view of an alternative embodiment of a web member attached to a cover member of a glove.
Figure 37:
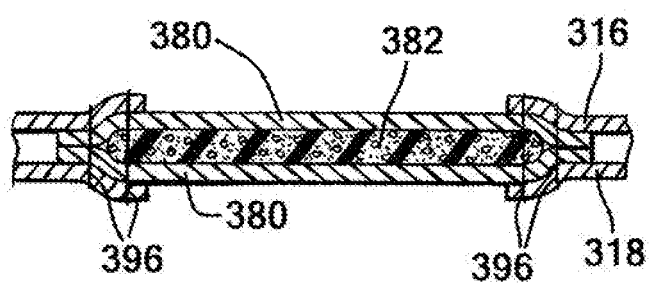
FIG. 37 is another schematic cross-sectional view of an alternative embodiment of a web member attached to a cover member of a glove.

FIG. 35 further show the construction and configuration of the web member 314 having the outer layer 380 and the inner layer 382. The inner layer 382 is encompassed or enclosed in the outer layer 380. As discussed, the layers 380,382 are operably secured to the cover member 312. In an additional connection configuration, the thread member 396 can pass through the inner layer 382 as well if desired such as shown in FIG. 37. FIG. 36 shows a schematic view of the web member 314 having a single layer, such as the inner layer 382, and connected to the cover member 312 by the thread member 396.

Figure 32:
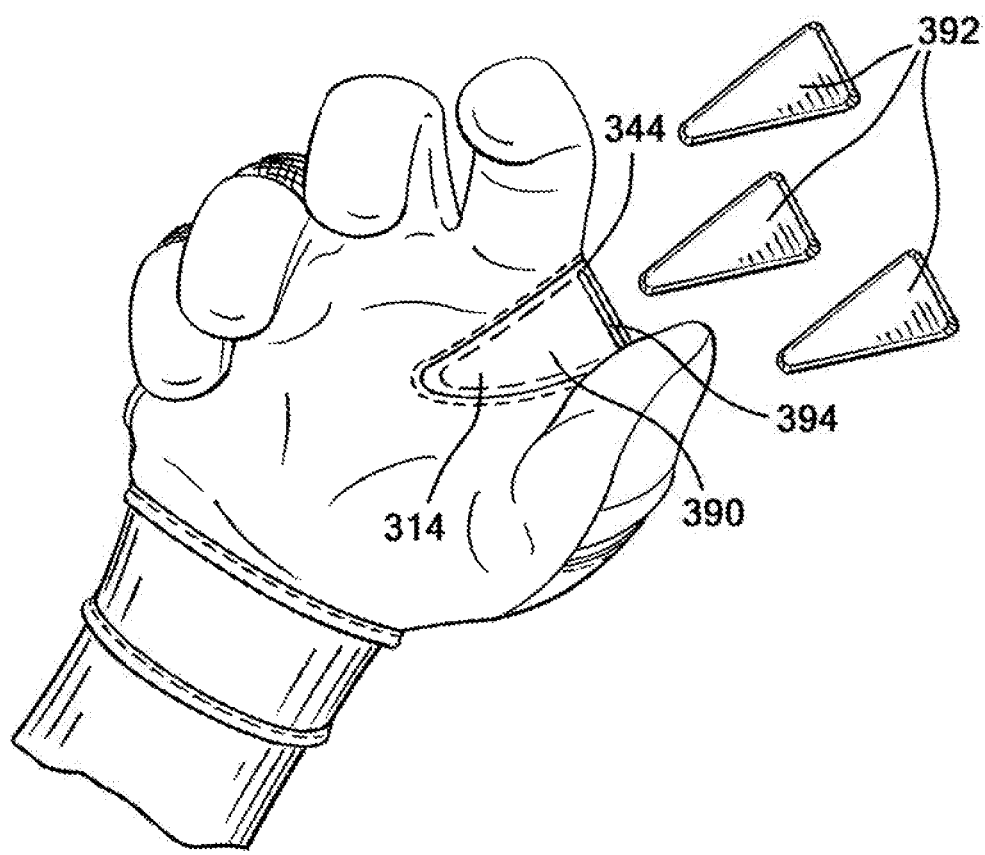
FIG. 32 is a perspective view of an alternative embodiment of a right-hand batting glove of FIG. 24 and showing a plurality of inserts associated with a web member of the glove.

FIG. 32 shows a further exemplary embodiment of the web member 314. In this embodiment, the web member 314 may define a pocket 390 therein. The pocket 390 can be filled with a variety of different inserts 392 in the form of cushioning members having various thicknesses, hardness, resiliency and other desired properties. Thus, the inserts 392 can have different levels of cushioning properties or durometers. The inserts 392 can also be various formulations of the polyurethane energy-absorbing material as described above. The inserts 392 could also take other forms and such as rubber members, foam members, gel members, putty members, silicone members, air-filled pillows or inflatable bellows members. As further shown in FIG. 35, the web member 14 may define an insert opening 394 such as at the outer peripheral segment 344 wherein the insert 392 may be inserted through the insert opening 394 and contained in the web member 314. It is understood that the insert 392 may correspond to the inner layer 382 as described above. The insert 392 may have the same overall shape as the outer layer 380 wherein peripheral edges of the insert 392 generally correspond and are slightly smaller in dimension wherein the insert 392 fits into the pocket 390 wherein the respective peripheral edges of the insert 392 are in confronting relation to the inside edges of the pocket 390. With the insert configuration, the web member 314 can have various cushioning properties to be customized to the particular athlete's desires for protection, comfort and performance. It is understood that the glove 300 may have a web member 314 having a plurality of different inserts 392 having different shock-absorbing properties to be chosen by a wearer of the glove 300. The glove 300, or pair of gloves 300 along with the plurality of inserts 392 may be considered a kit that is provided to the user with all such components as part of the kit. It is understood that the web member 314 can utilize a closure for the insert opening 394 such as a cover member or a hook and loop fastener, FIG. 32 shows the insert opening 394 generally at the outer peripheral segment 344. It is understood that the insert opening 394 may be positioned at other locations such as the top portion 384 of the outer layer 380 or the bottom portion 386 of the outer layer 380 wherein the opening may be defined by a flap configuration of the top portion 384 or the bottom portion 386.

Figure 32A:
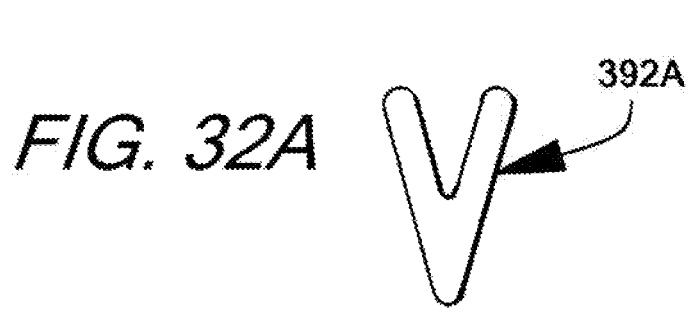
FIG. 32A is a plan view of an alternative embodiment of the insert associated with the member of the glove of FIG. 32.

FIG. 32A shows an alternative embodiment of the insert 392, generally designated with the reference numeral 392A. The insert 392A has a base portion with a portion removed to define a generally V-shaped insert 392A. The portion removed defines a pair of diverging segments 392B extending from the base portion and with a space or gap 392C defined between the diverging segments 392B. The insert 392A is received by the pocket 390 shown in FIG. 32. The space 392C is positioned between the top portion 384 and the bottom portion 386 and extending to the outer peripheral segment 344, which can provide particular comfort for certain users.

As shown in the figures, the web member 314 may have a generally uniform thickness. In a further exemplary embodiment, the web member 314 may have a variable thickness similar to the variable thicknesses of the web member 14 of FIGS. 6-8. For example, as can be appreciated from FIG. 8B, the web member 14 may have a greater thickness proximate the extension portion 362 and base portion 364 where the thickness decreases towards the outer peripheral segment 344. This could also be reversed wherein the web member 314 has a greater thickness proximate the outer peripheral segment 344. Thus, the web member 314 can have a tapered thickness starting from one end towards an opposite end. Thickness configurations may depend on the particular desires of the athlete wearing the glove 10,100,310. In certain exemplary embodiments, the web member may have a thickness of approximately 0.060 inch. The thickness could be in a range of approximately 0.050 inch to approximately 0.25 inch. In one exemplary embodiment, the web member thickness may be 0.187 inch including at the base portion of the web member.

It is understood that the web member 314 may be made from other materials including but not limited to rubber, silicone, vinyl, other types of polymer materials as well as Spandex, Lycra and Nylon. Other synthetic polymers could also be used such as neoprene. It is also understood the size of the web member as well as the material can be selected to provide a desired amount of tension around a bat handle. It is further contemplated that the tension around the bat handle can be adjustable to customize the feel for the athlete. In one exemplary embodiment, the web member 314 is made from a silicone material, a neoprene material or a combination of silicone material and neoprene material. Such a combination can provide a tacktified surface. As discussed, the web member 314 may have a first member and a second member confronting the first member and defining a pocket between the members or layers. Such a construction can provide an enhanced comfort level, cushioning level and grip enhancement to an athlete holding an implement such as a baseball bat. Alternatively, the web member 314 can be a solid member. The web member 314 in this exemplary embodiment is connected to the cover member 312 as various constructions as described herein. In yet a further exemplary embodiment, the web member 314 could be a member generally resistant to stretching such as a leather member.

FIGS. 31A and 31B disclose additional exemplary embodiments of the present invention. As discussed above for example with respect to FIGS. 8B and 8C, the web member 314 may define a variable thickness such as a tapered thickness across the length of the web member 314 from the base portion 364 to the outer peripheral segment 344. FIG. 31A shows the web member 314 defining an inner layer 382 positioned within the outer layer 380 as described above. As further shown in FIG. 31A, the web member 314 has a variable thickness or tapered thickness. The web member 314 has a greater thickness at the base portion 364 wherein the thickness of the web member 314 tapers and decreases towards the outer peripheral segment 344. Thus, the thickness of the web member 314 proximate the outer peripheral segment 344 is less than the thickness at the base portion 364. It is understood that the thickness of the extension portion 362 of the web member 314 is greater than the thickness of the web space portion 360 of the web member 314. Such configuration provides shock absorbing features and comfort to the thenar region of the hand as described herein. FIG. 31B shows a further exemplary embodiment of the web member 314, which also has a multi-layered configuration wherein the inner layer 382 is positioned within the outer layer 380. The extension portion 362 of the web member has thickness that is generally a constant thickness. In an additional alternative embodiment, the thickness of the extension portion 362 can vary and be tapered. As further shown in FIG. 31B, the thickness of the web member increases at an intermediate location IL between the base portion 364 and the outer peripheral segment 344. Thus, the increased thickness has a jogged-out portion. In an exemplary embodiment, the intermediate location is at the juncture between the extension portion 362 and the web space portion 360. The thickness of the web space portion 360 tapers from the juncture towards the outer peripheral segment 344 in a decreasing taper. The outer peripheral segment 344 has the lesser thickness compared to the web space portion 360 at the juncture. Such configuration provides shock absorbing features and comfort to the thenar region of the hand as described herein. It is understood that the tapered thickness decreases from the base portion 362 towards the outer peripheral segment 344 in one embodiment, but can be reversed in other embodiments. In still a further embodiment, the thickness of the extension portion 362 and the web space portion 360 can taper differently and in different directions and with varying thicknesses. It is understood that the tapered thickness could also taper across a lateral extent of the web member 314. It is further understood that the web member 314 can have other different thickness configurations such as where the extension portion 362 has a greater thickness than the thickness of the web member 314 proximate the outer peripheral segment 344. In still a further alternative embodiment, the web member may have a maximum thickness at a central or intermediate area of the web member wherein the thickness of the web member decreases both towards the base portion 364 and towards the outer peripheral segment 344. The tapered thickness configurations provide further comfort and shock absorbing features. It is further understood that the tapered configurations also incorporate the multi-layered configurations of the web member 314.

Figure 38:
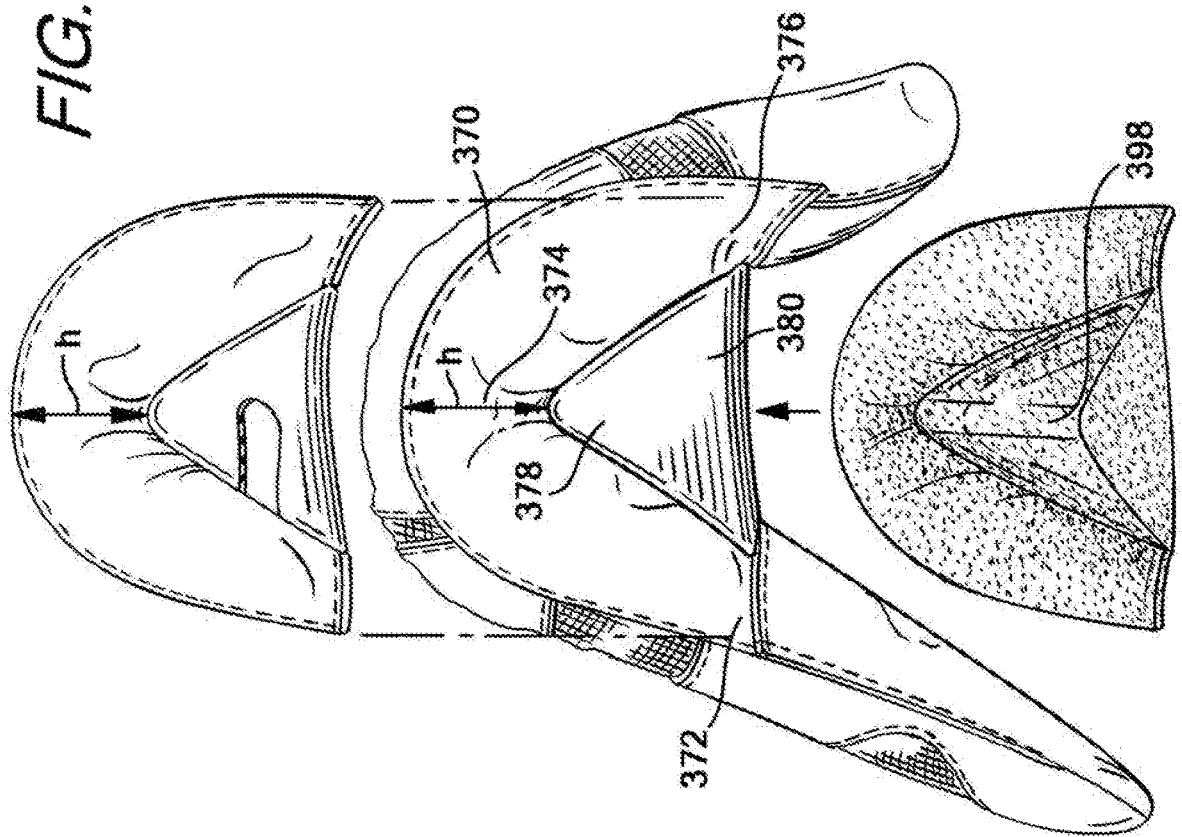
FIG. 38 is a partial top perspective view the batting glove of FIG. 24 showing a recessed compartment associated therewith and further showing a portion in exploded view.

FIG. 38 shows an additional exemplary embodiment of the batting glove 310. In this exemplary embodiment, an external insert 398 can be used and positioned generally on a top portion of the glove 310 and generally in the recessed compartment 378 defined by the glove 310. The external insert 398 is dimensioned to conform to the shape of the recessed compartment 378. The external insert 398 can be made from a foam material having resiliently compressible properties. The external insert 398 can be made from any of the materials described herein. A releasable fastener mechanism can also be used between the external insert 398 and the glove 310 to maintain the releasable connection between the external insert 398 and the glove 310. The external insert 398 provides further shock absorbing properties.

In use, a baseball player may typically wear a batting glove 310 on each hand. As shown in FIGS. 42-46, when holding and gripping the bat 54, the bat handle 56 rests generally in the palm portion of the hands and ideally, more towards where the fingers meet the palm. When the player grips the bat 56, the web member 314 smoothly wraps around the circumference of the bat handle 56. In an exemplary embodiment, the web member 314 conforms around the bat handle 56. As further shown, the web member 314 is placed in a curved configuration and is in surface-to-surface contact with the bat handle 56. The web member 314 is not "scrunched" or unevenly pressed against the bat or hand. The web member 314 does not overlap upon itself when engaged with the baseball bat 54. Thus, the web member 314 is void of any creases, wrinkles or overlaps providing a comfortable grip of the bat 54. This smooth, surface-to-surface contact with the bat handle implement extends from the curved portion 342, including the extension portion 362, to the distal outer peripheral segment 344. In addition, it is understood that the extension portion 362 engages the bat handle to provide additional comfort to the thenar region of the wearer's hand as the extension portion 362 is configured to be positioned over the adductor pollicis muscle AP of the hand. FIG. 34 also shows the extension portion 362 positioned over the trigger point TP associated with the adductor pollicis muscle AP of the hand. The offset connections associated with the web member 314, bottom portion 318 and top portion 316 assist in providing a comfortable grip with the extension portion 362 being able to be placed between the bat handle and the thenar region of the wearer's hand. The recessed compartment 378 can also receive a portion of the bat handle 56 for increased comfort and handling of the bat by the athlete. The web member 314 forms a tight engagement against the bat handle 56. The connection of the web member 314 with the top portion 316 and bottom portion 318 assists in the web member 314 being in position to be comfortable against the bat handle implement and provide the cushioning and shock absorption as described herein. The material selection for the web member 314 further provides for a proper amount of extension around the bat handle 56 and enhanced gripping of the bat handle 56 as well as shock absorption properties.

Figure 45:
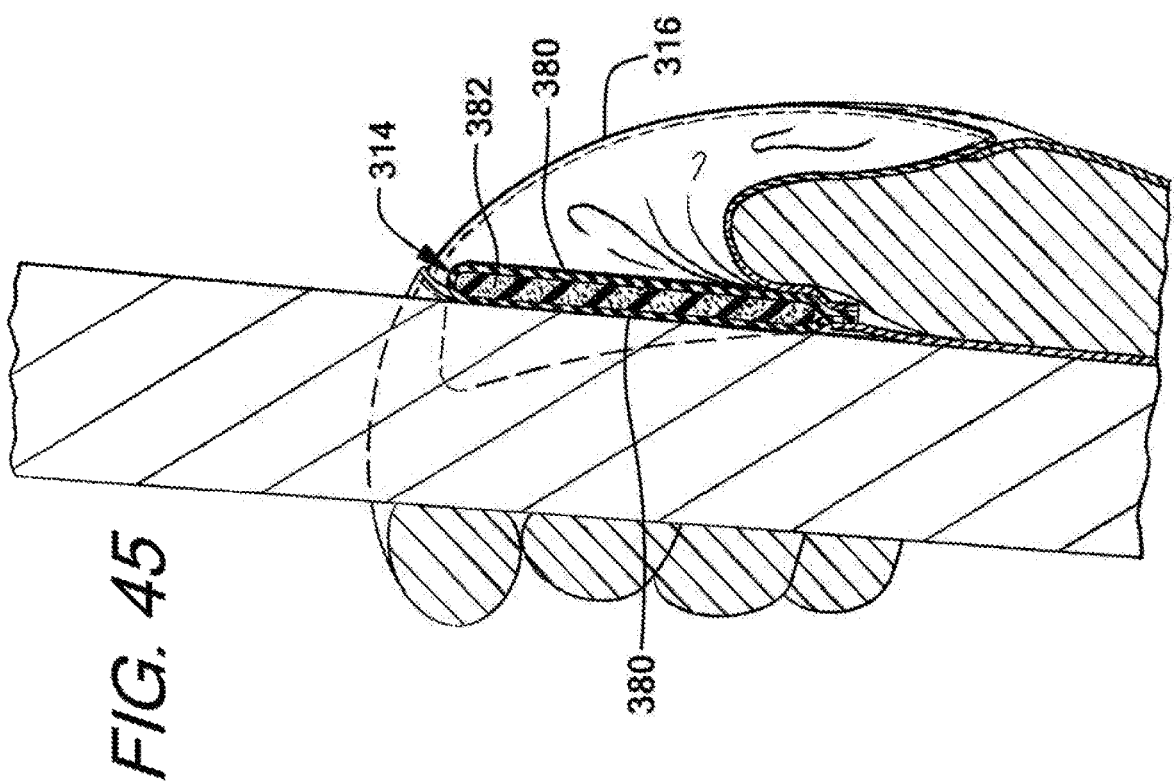
FIGS. 45-46 are partial schematic views of a wearer/user of the batting glove of FIG. 24 and gripping a bat.
Figure 46:
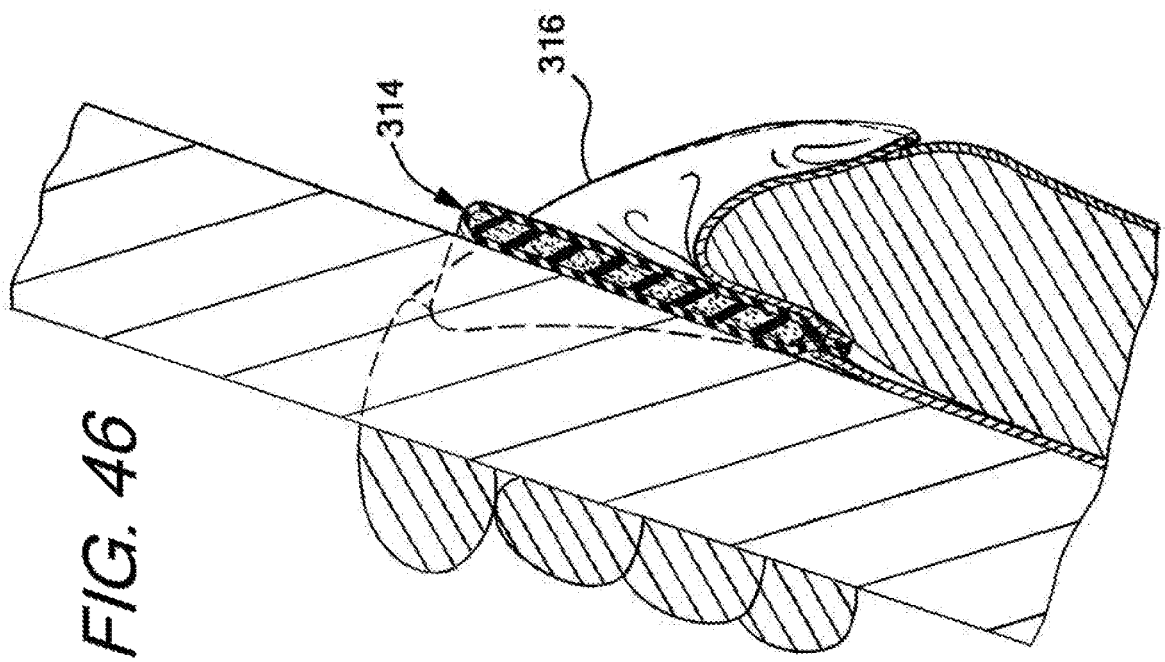

In this configuration, the web member 314 is also placed against the thenar region of the hand and portions of the web member 314, the web space portion 360, also extend in the thenar space. This configuration can be appreciated from FIGS. 45-46 wherein the web member 314 provides an intermediary between the bat handle 56 and the wearer's hand. As further can be appreciated from FIGS. 45-46, the web member 314 minimizes, cushions, absorbs and dissipates force created in response to the player swinging the bat 54 and hitting a ball with the bat 54 (See e.g., FIG. 44). Because of the material construction of the web member 314 and smooth surface-to-surface contact between the web member 314 and the handle 56 of the baseball bat 54, the player experiences a good comfortable grip that also minimizes force impacts into the thenar region of the hand from hitting a ball with the bat 56. For example, as shown in FIGS. 45-46, the web member 314, including the extension portion 362, provides comfortable cushioning to the thenar region of the hand when hitting a ball even if the athlete is "jammed" (FIG. 11) and further provides comfortable cushioning if the athlete hits the ball at the end of the bat (FIG. 12). The web space portion 360 of the web member 314 that wraps around the bat handle 56 provides a comfortable grip and cushioning to the thenar region of the user's hand. The extension portion 362 also provides enhanced cushioning such as against the adductor pollicis muscle AP of the user's hand. The extension portion 362 minimizes chances that the tripper point TP can turn "ON" wherein pain would be distributed to the user's hand as discussed with respect to FIG. 33B. The extension portion 362 assists in limiting pain or discomfort in the thenar region of the hand. Furthermore, the inner layer 382 of the web member 314 constituting the resiliently-compressible material or other intelligent shock-absorbing material, provides additional enhanced comfort to the wearer when hitting a ball. As discussed, upon impact the resiliently-compressible material can become rigid to provide enhanced shock-absorbing properties. After impact, the material returns to its more flexible state as discussed herein. These structural features cooperate to independently or collectively provide enhanced shock absorbing properties for the user.

In further exemplary embodiments, various types of sensors could be incorporated into the gloves 10, 100 or the cushioning device 200 disclosed herein. Sensors such as accelerometers or force sensors could be incorporated into the web element or other portions of the devices. The sensors could be utilized to indicate bat speed or the level of force incurred at the web element or against the thenar region of the hand.

The cushioning apparatus in the form of the batting glove of the present invention provides several benefits. First, the batting glove minimizes or takes stress off selected parts of the human hand, particularly in the thenar region of the hand. This may include the tissue generally between the forefinger and thumb and part of the palm and including the main thenar muscles, namely the abductor pollicis, brevis, the flexor pollicis brevis and the opponens pollicis. Thus, the batting glove protects the wearer from injury from distributed shocks and impacts that occur in response to hitting a pitched ball with a bat, especially from repetitive swinging of the bat in hitting pitched balls. As shown for example in FIGS. 11-12, the web member wraps around the bat handle in surface-to-surface contact void of any creases or folds. This provides an efficient and comfortable cushioning effect for the thenar region of the user's hand. The web element is uniquely connected to the cover member that assists in allowing the web element to get into the desired position against the bat. The web element is connected at the junction of the top and bottom cover portions allowing the web element to reside in the web space S between the forefinger element and thumb element. Thus, connection further allows the web element to reside in the plane P collectively defined by the forefinger element and thumb element rather than in a position above or below the plane P such as if the web element was connected on top or underneath the forefinger and thumb elements. The unique connection disclosed herein provides for the enhanced comfortable feel against the handle of the bat and the resulting enhanced cushioning effects of the web member. The construction also can minimize the discomfort experienced in the fingers, i.e., stinging in the fingers, from excessive bat vibration.

Upon considerable testing by the inventors herein, it has been found that this cushioning configuration of the web element is most comfortable for a user. It has been found that the configuration provides a natural feel when holding the bat while providing enhanced cushioning. It has further been found that in this cushioning configuration, any additional padding in the palm area of the batting glove is unnecessary. Indeed, the testing has determined that many players prefer to have less padding specifically at the thenar region of the palm as it provides a better "feel" of the bat in the hands of the user. Because of the seamless construction of the web member into the batting glove, the batting glove is easily worn under a fielder's glove as players often like to wear a batting glove in the fielder's glove when playing the field. In addition, the web member is integral with the batting glove eliminating the need for other separate devices to cushion the hand. For example, some players use a portable pad design that has a ring portion that fits over the thumb. These devices, however, are cumbersome and often do not provide a stable feel for the player. In addition, the device must be carried separately and used in conjunction with the batting glove. The web member of the present invention is a seamless, integral component of the batting glove. The batting gloves further reduce the overall wear and tear on the hands of the athlete. The batting gloves having the web member further aid in natural hand alignment on the bat and aids in keeping the hands in place once initially properly positioned. The batting gloves further promote increased bat speed and ball exit speed. As discussed, the extension portion of the web member is positioned into the palm portion of the bottom member of the batting glove. In this structural configuration, the extension portion is configured to be positioned over at least the adductor pollicis muscle in the hand of the wearer/user of the glove. This structure provides increased cushioning and comfort to the user's hand. The material selection of the inner layer of the web member further enhances the shock absorbing characteristics and comfort to the thenar region of the hand.

The cushioning apparatus of FIGS. 16-23 also provides several benefits. The cushioning apparatus also minimizes force impacts to the thenar region of the hand like the batting gloves of FIGS. 3-15. The wristband cushioning apparatus can also be removably attached to a batting glove as desired. A player can wear the wristband on the wrist in the unfastened configuration when the player is not hitting. The player can easily remove the wristband and change to the fastened configuration to be worn on the forefinger and thumb such as over a batting glove to provide cushioning when hitting. Furthermore, after an at-bat, the player can quickly remove the apparatus from the batting glove and again wear the apparatus on the wrist. The cushioning apparatus can also be worn under a fielder's glove to provide cushioning when playing the field.

As discussed above, the invention is particularly applicable to batting gloves for baseball players swinging a bat and hitting baseballs. The invention is equally applicable to softball batting gloves including girls fastpitch batting gloves. The invention can also be incorporated into other types of gloves intended for use in various other activities including golf, tennis, racquetball, hockey and lacrosse or any other sports utilizing hand-held implements. The invention could be incorporated into football-related gloves. The invention could further be incorporated into cycling gloves for gripping handlebars. The invention could further be incorporated into gloves for non-sports related activities such as gardening, farming, automotive or other activities. For example, the gloves could be helpful when performing other repetitive use activities such as raking with a rake or sweeping with a broom. The gloves could also help when climbing ladders.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. A batting glove comprising:
a cover member having a top portion and a bottom portion cooperating to define a central opening and a plurality of finger elements including a forefinger element and a thumb element configured to receive respective fingers and thumb of a user, the cover member configured to provide closed distal ends of the plurality of finger elements and cover an entire hand of the user, a web space defined between the forefinger element and the thumb element, wherein the bottom portion has a palm portion and wherein the forefinger element defines a first longitudinal axis through a central portion of the forefinger element, the first longitudinal axis extends into the palm portion of the bottom portion, wherein the plurality of finger elements further includes a middle finger element adjacent the forefinger element, the forefinger element further defines a second longitudinal axis through an end of the forefinger element adjacent the middle finger element that extends into the palm portion of the bottom portion; and
a web member having a first portion connected to the forefinger element and a second portion connected to the thumb element wherein the web member is positioned in the web space, wherein the web member defines a free perimeter edge that extends across the web space from the first portion to the second portion, the web member further having an extension portion extending into the bottom portion of the cover member, wherein the extension portion extends into the palm portion wherein the extension portion is configured to cover a portion of a palm of the hand of the user wearing the batting glove, the extension portion extending past the first longitudinal axis, the extension portion extending proximate to the second longitudinal axis.

2. The batting glove of claim 1 wherein the extension portion is configured to be positioned over an adductor pollicis muscle of the hand of the user wearing the batting glove.

3. The batting glove of claim 2 wherein the thumb element defines a thumb longitudinal axis through a central portion of the thumb element and the extension portion extends into the bottom portion in a direction generally parallel to the thumb longitudinal axis of the thumb element.

4. The batting glove of claim 1 wherein the web member is generally V-shaped and defining a base wherein the base is positioned in the bottom portion of the cover member.

5. The batting glove of claim 1 wherein the free perimeter edge is integral with the extension portion.

6. The batting glove of claim 1 wherein the first portion of the web member is connected proximate a base of the forefinger element and the second portion of the web member is connected proximate a midpoint of the thumb element.

7. The batting glove of claim 1 wherein the web member is configured to engage a handle surface of a bat in response to the user gripping the bat and wherein the web member minimizes force against a thenar region of the user's hand in response to the bat hitting a ball.

8. The batting glove of claim 1 wherein the web member is configured to engage a curved handle surface of a bat in response to the user gripping the bat wherein the web member is in a curved configuration and in surface-to-surface contact with the curved handle surface of the bat, and wherein the web member is void of any overlapping upon itself, and wherein the extension portion is configured to be positioned between the curved handle surface of the bat and the adductor pollicis muscle of the user, wherein the web member minimizes force against a thenar region of the user's hand in response to the bat hitting a ball.

9. The batting glove of claim 1 wherein the web member has an outer layer and an inner layer, wherein the outer layer encloses the inner layer.

10. The batting glove of claim 9 wherein the outer layer is made from a material that is the same as a material of the bottom portion of the cover member and wherein the inner layer is a composite material that is resiliently compressible.

11. The batting glove of claim 10 wherein the inner layer is an energy absorbing composite material having a solid foamed synthetic polymer matrix, and a polymer-based dilatant that is distributed through the polymer of the matrix and incorporated into the polymer of the matrix during formation of the polymer matrix, and a fluid distributed through the matrix, wherein the combination of the matrix, dilatant and fluid provides a composite material that is flexible and resiliently compressible.

12. The batting glove of claim 11 wherein the bottom portion has a palm portion and the extension portion extends into the palm portion wherein the extension portion is configured to cover a portion of a palm of the hand of the user wearing the batting glove, wherein the forefinger element defines a first longitudinal axis through a central portion of the forefinger element that extends into the palm portion of the of bottom member, the extension portion extending past the first longitudinal axis, wherein the extension portion is further configured to cover an adductor pollicis muscle of the hand of the user wearing the batting glove.

13. The batting glove of claim 10 wherein the outer layer of the web member comprises a first segment and a second segment, the first segment and the second segment operably connected together to form a pocket therebetween, the inner layer of the web member positioned in the pocket.

14. The batting glove of claim 13 wherein the first segment and the second segment are connected together between the top portion and the bottom portion by a connection member, the inner layer positioned within the connection member.

15. The batting glove of claim 14 wherein the connection member is a thread member stitched through the top portion, first segment, second segment and the bottom portion.

16. The batting glove of claim 9 wherein the outer layer of the web member comprises a first segment and a second segment, the inner layer of the web member positioned between the first segment and the second segment.

17. The batting glove of claim 16 wherein the top portion, the first segment, the inner layer, the second segment and the bottom portion are connected together by a stitched thread member.

18. The batting glove of claim 13 wherein the inner layer is an energy absorbing composite material having a solid foamed synthetic polymer matrix, and a polymer-based dilatant that is distributed through the polymer of the matrix and incorporated into the polymer of the matrix during formation of the polymer matrix, and a fluid distributed through the matrix, wherein the combination of the matrix, dilatant and fluid provides a composite material that is flexible and resiliently compressible.

19. The batting glove of claim 1 wherein the web member has a thickness in the range of approximately 0.05 inch to approximately 0.25 inch.

20. The batting glove of claim 1 wherein the web member is an energy absorbing material having a foam base, and a polymer based material operably associated with the foam base, the polymer based material having dilatant properties having molecules that in a first state move freely within the foam base wherein the web member is flexible and in response to an impact, the molecules lock together to define a second state wherein the molecules lock together wherein the web member is less flexible, and after impact, the molecules again move freely within the foam base in the first state.

21. The batting glove of claim 1 wherein the web member defines a base and wherein the free perimeter edge is opposite the base, the top portion defining a curved wall that extends from a first end of the free perimeter edge, around the base, and to a second end of the free perimeter edge.

22. The batting glove of claim 21 wherein the curved wall has a greater height dimension proximate the base of the web member than a height dimension at the first end and the second end of the free perimeter edge of the web member.

23. The batting glove of claim 22 wherein the curved wall has a maximum height dimension proximate the base of the web member wherein the height dimension of the wall tapers down towards the first end and the second end of the free perimeter edge of the web member.

24. The batting glove of claim 23 wherein a top surface of the web member and the curved wall cooperatively define a recessed compartment proximate the top portion.

25. A batting glove comprising:
a cover member having a top portion and a bottom portion cooperating to define a central opening and a plurality of finger elements including a forefinger element and a thumb element configured to receive respective fingers and thumb of a user, the cover member configured to provide closed distal ends of the plurality of finger elements and cover an entire hand of the user, a web space defined between the forefinger element and the thumb element; and
a web member having a first portion connected to the forefinger element and a second portion connected to the thumb element wherein the web member is positioned in the web space, the web member having a free perimeter edge that extends across the web space from the forefinger element to the thumb element, wherein the web member has an outer layer and an inner layer, wherein the outer layer encloses the inner layer, wherein the outer layer of the web member comprises a first segment and a second segment, first segment and the second segment operably connected together to form a pocket therebetween, the inner layer of the web member positioned in the pocket, wherein the bottom portion has a palm portion and the web member has an extension portion wherein the extension portion extends into the palm portion, wherein the forefinger element defines a first longitudinal axis through a center of the forefinger element and along an entire length of the forefinger element wherein the first longitudinal axis further extends into the palm portion of the bottom member, the extension portion extending past the first longitudinal axis, wherein the extension portion is configured to cover a portion of a palm of a hand of the user wearing the batting glove.

26. The batting glove of claim 25 wherein the inner layer is an energy absorbing composite material having a solid foamed synthetic polymer matrix, and a polymer-based dilatant that is distributed through the polymer of the matrix and incorporated into the polymer of the matrix during formation of the polymer matrix, and a fluid distributed through the matrix, wherein the combination of the matrix, dilatant and fluid provides a composite material that is flexible and resiliently compressible.

27. A batting glove comprising:
a cover member having a top portion and a bottom portion cooperating to define a central opening and a plurality of finger elements including a forefinger element and a thumb element configured to receive respective fingers and thumb of a user, the cover member configured to provide closed distal ends of the plurality of finger elements and cover an entire hand of the user, wherein the bottom portion has a palm portion, a web space defined between the forefinger element and the thumb element; and a web member having a first portion connected to the forefinger element and a second portion connected to the thumb element wherein the web member is positioned in the web space, the web member having a free perimeter edge that extends across the web space from the forefinger element to the thumb element, wherein the web member has an outer layer and an inner layer, wherein the outer layer encloses the inner layer, wherein the outer layer of the web member comprises a first segment and a second segment, the first segment and the second segment operably connected together to form a pocket therebetween, the inner layer of the web member positioned in the pocket, the web member further having an extension portion wherein the extension portion extends into the palm portion, wherein the forefinger element defines a first longitudinal axis through a center of the forefinger element and along an entire length of the forefinger element wherein the first longitudinal axis extends into the palm portion of the bottom member, the extension portion extending past the first longitudinal axis, wherein the extension portion is configured to cover a portion of a palm of the hand of the user wearing the batting glove, and wherein the inner layer is an energy absorbing composite material having a solid foamed synthetic polymer matrix, and a polymer-based dilatant that is distributed through the polymer of the matrix and incorporated into the polymer of the matrix during formation of the polymer matrix, and a fluid distributed through the matrix, wherein the combination of the matrix, dilatant and fluid provides a composite material that is flexible and resiliently compressible, wherein the web member is configured to engage a curved handle surface of a bat in response to the user gripping the bat wherein the web member is in a curved configuration and in surface-to-surface contact with the curved handle surface of the bat, and wherein the web member is void of any overlapping upon itself, and wherein the extension portion is configured to be positioned between the curved handle surface of the bat and the adductor pollicis muscle of the user, wherein the web member minimizes force against a thenar region of the user's hand in response to the bat hitting a ball.

28. A batting glove comprising:

a cover member having a top portion and a bottom portion cooperating to define a central opening and a plurality of finger elements including a forefinger element and a thumb element configured to receive respective fingers and thumb of a user, the plurality of finger elements further including separate middle finger element, ring finger element and little finger element wherein spaces are defined respectively between the middle finger element, the ring finger element and the little finger element, the cover member configured to provide closed distal ends of the plurality of finger elements and cover an entire hand of the user, a web space defined between the forefinger element and the thumb element; and a web member having a first portion connected to the forefinger element and a second portion connected to the thumb element wherein the web member is positioned in the web space, the web member further having an extension portion having a base extending into the bottom portion of the cover member, wherein the web member defines a free perimeter edge that extends across the web space from the first portion to the second portion, wherein the web member has an outer layer and an inner layer, wherein the outer layer encloses the inner layer, wherein the outer layer of the web member comprises a first segment and a second segment, the first segment and the second segment operably connected together to form a pocket therebetween, the pocket extending from the free perimeter edge to the base of the extension portion, the inner layer of the web member positioned in the pocket from the free perimeter edge to the base of the extension portion, wherein the first segment and the second segment of the outer layer define a smooth and uninterrupted surface.

29. The batting glove of claim 28 wherein the inner layer occupies substantially the entire pocket from the free perimeter edge to proximate the base.

30. A batting glove comprising:

a cover member having a top portion and a bottom portion cooperating to define a central opening and a plurality of finger elements including a forefinger element and a thumb element configured to receive respective fingers and thumb of a user, the cover member configured to provide closed distal ends of the plurality of finger elements and cover an entire hand of the user, a web space defined between the forefinger element and the thumb element; and a web member having a first portion connected to the forefinger element and a second portion connected to the thumb element wherein the web member is positioned in the web space, wherein the web member defines an outer peripheral segment that extends across the web space from the first portion to the second portion, the web member further having an extension portion extending into the bottom portion of the cover member, wherein the web member defines a base and wherein the outer peripheral segment is opposite the base, the top portion defining a curved wall that extends from a first end of the outer peripheral segment, around the base, and to a second end of the outer peripheral segment, wherein the curved wall has a greater height dimension proximate the base of the web member than a height dimension at the first end and the second end of the outer peripheral segment of the web member.

31. A batting glove comprising:

a cover member having a top portion and a bottom portion cooperating to define a central opening and a plurality of finger elements including a forefinger element and a thumb element configured to receive respective fingers and thumb of a user, the cover member configured to provide closed distal ends of the plurality of finger elements and cover an entire hand of the user, a web space defined between the forefinger element and the thumb element; and a web member having a first portion connected to the forefinger element and a second portion connected to the thumb element wherein the web member is positioned in the web space, wherein the web member defines a free perimeter edge that extends across the web space from the first portion to the second portion, the web member further having an extension portion extending into the bottom portion of the cover member, wherein the web member defines a base and wherein the free perimeter edge is opposite the base, the top portion defining a curved wall that extends from a first end of the free perimeter edge, around the base, and to a second end of the free perimeter edge, wherein the curved wall has a greater height dimension proximate the base of the web member than a height dimension at the first end and the second end of the free perimeter edge of the web member.

* * * * *